US012600430B2

(12) United States Patent (10) Patent No.: US 12,600,430 B2
Van Druten (45) Date of Patent: Apr. 14, 2026

(54) TORQUE SUPPORT ASSEMBLY, A TORQUE SUPPORT DEVICE, A WHEEL SECURING DEVICE, A REAR AXLE ASSEMBLY AND A BICYCLE

(71) Applicant: Classified Cycling BV, Antwerp (BE)

(72) Inventor: Roëll Marie Van Druten, Antwerp (BE)

(73) Assignee: CLASSIFIED CYCLING B.V., Antwerp (BE)

( * ) Notice: Subject to any disclaimer, the term of this patent is extended or adjusted under 35 U.S.C. 154(b) by 737 days.

(21) Appl. No.: 17/797,310

(22) PCT Filed: Feb. 8, 2021

(86) PCT No.: PCT/NL2021/050084
§ 371 (c)(1),
(2) Date: Aug. 3, 2022

(87) PCT Pub. No.: WO2021/158116
PCT Pub. Date: Aug. 12, 2021

(65) Prior Publication Data
US 2023/0049132 A1 Feb. 16, 2023

(30) Foreign Application Priority Data

Feb. 7, 2020 (NL) ...................................... 2024855
Aug. 21, 2020 (NL) ...................................... 2026323
Dec. 21, 2020 (NL) ...................................... 2027194

(51) Int. Cl.
B62K 25/02 (2006.01)
B60B 27/02 (2006.01)
B60B 35/00 (2006.01)

(52) U.S. Cl.
CPC ............ *B62K 25/02* (2013.01); *B60B 27/026* (2013.01); *B60B 35/006* (2013.01); *B62K 2025/025* (2013.01)

(58) Field of Classification Search
CPC ...... B62K 25/02; B62K 2206/00; B62M 6/65; B60B 35/006; B60B 27/023; B60B 27/026
See application file for complete search history.

(56) References Cited

U.S. PATENT DOCUMENTS

2006/0158022 A1    7/2006   Nicolai
2010/0170762 A1    7/2010   Schlanger
(Continued)

FOREIGN PATENT DOCUMENTS

CN      101531119 A    9/2009
CN      102963210 A    3/2013
(Continued)

OTHER PUBLICATIONS

Extended European Search Report dated Sep. 19, 2024, issued in corresponding European Patent Application No. 24160097.2 (12 pgs.).

(Continued)

*Primary Examiner* — Christopher B Wehrly
(74) *Attorney, Agent, or Firm* — Pillsbury Winthrop Shaw Pittman, LLP

(57) ABSTRACT

A torque support assembly, for supporting a torque of a hollow shaft onto a frame of a bicycle, comprising a cam comprising a cam hole for receiving therein a distal end of the shaft, wherein the cam hole and the shaft are interlockingly shaped for rotationally locking the cam and shaft with respect to each other, an adapter interface comprising a first face defining a seat for the cam, and an adapter interface through hole which extends from the seat on the first face (Continued)

1 and is coaxial with the cam hole for allowing a thru-axle to extend there through. The adapter interface comprises an upstanding wall, extending outward from the first face, defining an inner support surface of the seat on which the cam is supported against rotation.

19 Claims, 16 Drawing Sheets

(56)                References Cited

U.S. PATENT DOCUMENTS

| | | | |
|---|---|---|---|
| 2010/0267510 A1 | 10/2010 | Nichols et al. | |
| 2012/0228851 A1 | 9/2012 | Chen | |
| 2013/0015009 A1* | 1/2013 | Lin | B62K 25/02 |
| | | | 280/281.1 |
| 2013/0241175 A1* | 9/2013 | Talavasek | B62M 6/60 |
| | | | 280/288.4 |
| 2016/0207587 A1* | 7/2016 | Schottler | B62L 1/005 |
| 2016/0362160 A1 | 12/2016 | Van Druten et al. | |
| 2017/0368871 A1 | 12/2017 | Ebersbach | |

FOREIGN PATENT DOCUMENTS

| | | |
|---|---|---|
| CN | 106457892 A | 2/2017 |
| CN | 108290616 A | 7/2018 |
| DE | 102004063505 A1 | 7/2006 |
| DE | 202014103414 U1 | 12/2015 |
| DE | 102018126435 A1 | 5/2019 |
| EP | 2557029 A1 | 2/2013 |
| EP | 2565052 A2 | 3/2013 |
| EP | 2419658 B1 | 10/2013 |
| EP | 3670315 A2 | 6/2020 |
| EP | 3670315 A3 | 8/2020 |
| JP | 8-337191 A | 12/1996 |
| JP | H08-337191 A | 12/1996 |
| WO | WO-2018199761 A1 * | 11/2018 ............. B62J 45/41 |

OTHER PUBLICATIONS

International Search Report dated Jun. 22, 2021, issued in corresponding International Application No. PCT/NL2021/050084 (6 pgs.).

Written Opinion of the International Searching Authority dated Jun. 22, 2021, issued in corresponding International Application No. PCT/NL2021/050084 (15 pgs.).

First Office Action dated Jun. 28, 2025, issued in corresponding Chinese Patent Application No. 202180012752.8, with English translation (12 pgs.).

* cited by examiner

<u>1</u>

S

130

11

Steekasopname

31

32

30

33

34
Typisch:5°~40°

3

5

1

3

5

TORQUE SUPPORT ASSEMBLY, A TORQUE SUPPORT DEVICE, A WHEEL SECURING DEVICE, A REAR AXLE ASSEMBLY AND A BICYCLE

CROSS-REFERENCE TO RELATED APPLICATIONS

This application is a national stage entry of PCT/NL2021/050084, filed Feb. 8, 2021, which claims priority to Netherlands Application No. 2024855, filed Feb. 7, 2020, Netherlands Application No. 2026323, filed Aug. 21, 2020 and Netherlands Application No. 2027194, filed Dec. 21, 2020, the contents of each of which are herein incorporated by reference in their entireties.

FIELD OF THE INVENTION

The invention concerns a torque support assembly, for supporting a torque of a hollow shaft onto a frame of a bicycle, a rear axle assembly comprising said torque support assembly, and a bicycle comprising said rear axle assembly.

BACKGROUND TO THE INVENTION

A Flat Mount is a disc brake mounting system and an open standard for sport bicycles. In the Flat Mount Brake Assembly (FMBA) a height of the mounting surface(s) for a brake caliper relative to the mounting position of the hub axle is fixed. The mounting surface for a brake caliper is normally fixed within +/−0.15 mm in height. The height of mounting surfaces can be chosen at the discretion of the frame builder, but is generally between 10-35 mm, wherein between frames differences between 10-35 mm can be observed quantified in steps of 5 mm. By far the majority of the current gravel and road bikes are compliant with the Flat Mount standard. Furthermore, a substantial amount of bicycle frames today seem to have a cam length of 20-25 mm. In such bicycles switching gears may occur via a fixed transmission to a shaft of a rear wheel axle, or by engaging the shaft of a rear wheel axle. Braking generally occurs by means of a caliper that engages a braking rotor that is supported on the shaft of the axle.

During the replacement of a wheel, a rear wheel in particular, the fitting of a replacement wheel may be hindered by alignment issues, such as may arise when the braking caliper and braking rotor are misaligned. The person replacing the wheel would have to insert the wheel just right in order to avoid such a misalignment.

SUMMARY OF THE INVENTION

It is an object of the invention to provide a torque support assembly which overcomes the above mentioned disadvantage. To this end according to an aspect there is provided a torque support assembly, for supporting a torque of a hollow shaft onto a frame of a bicycle, comprising a cam comprising a cam hole for receiving therein a distal end of the shaft, wherein the cam hole and the shaft are interlockingly shaped for rotationally locking the cam and shaft with respect to each other, an adapter interface comprising a first face defining a seat for the cam, and an adapter interface through hole which extends from the seat on the first face and is coaxial with the cam hole for allowing a thru-axle to extend there through. The adapter interface comprises an upstanding wall, extending outward from the first face, defining an inner support surface of the seat on which the cam is supported against rotation. The cam and adapter interface allow for mounting the hollow shaft to the frame, e.g. between the drop outs, such that toque can be transferred from the hollow shaft to the frame, via the cam and adapter interface. Thus, the hollow shaft can be prevented from rotating relative to the frame while transferring torque to the frame. Nevertheless, easy mounting and dismounting of the hollow shaft relative to the frame is still possible. Also, by supporting the end of the hollow shaft in the seat of the adapter interface by means of the cam the manner in which the shaft is positioned between the rear wheel (or front wheel) drop outs is pre-determined, which prevents any misalignment of brake caliper and brake rotor, also known as a brake disk. This is similarly true for the alignment of any transmission components.

The adapter interface may for example be arranged for supporting at least some reactionary forces onto the frame via an edge of the dropout recess of the frame. This reduces stresses on the connection with which the adapter interface is fixed to the frame such as to increase the durability of the assembly.

Optionally, the cam comprises a cam through hole. However, it is also envisaged that the cam hole is an at least partially blind hole.

Optionally, the adapter interface is placed on an adapter comprising a second face, opposite the first face, for being inserted therewith into a recess of a drop out of the frame and wherein the adapter is fixable to the frame.

Optionally, the adapter interface is integrated in or with a drop out of the frame. The adapter can be arranged for supporting at least some torque forces onto the frame via an edge of the dropout recess of the frame.

Optionally, the adapter is arranged for supporting at least some torque forces onto the frame via the through hole of the dropout recess of the frame.

Optionally, the adapter is arranged for supporting at least some torque forces onto the frame via the brake caliper connection of the frame.

Optionally, the adapter is arranged to refrain from supporting torque to the dropout. The adapter can be arranged to refrain from supporting torque to the dropout recess edge. Then for instance the torque can be supported onto the frame outside the dropout recess, such as outside the dropout, e.g. at the brake caliper connection of the frame.

Optionally, the adapter is arranged for supporting at least some torque forces onto the frame via the thru-axle.

Optionally, the cam is arranged for supporting at least some torque forces onto the frame via the thru-axle.

The upstanding wall may further be formed as a complementary shape, also known as a counter shape, to an upper contour of the cam, such that the cam self-centers within the seat when, in use, an upward force is exerted on the cam by interaction of the upper contour of the cam and the upstanding wall. This may save time when changing wheels, as this allows the assembly to self center when the wheel and bicycle are assembled. It is noted that the benefit of the above feature is pronounced when the cam is attached to the hollow shaft and the adapter is fixed to the frame. The term "in use" in this context refers to the normal upright position of the bicycle.

The cam may comprise a tooth, wherein a part of the inner support surface is arranged for supporting the upper tooth surface of the cam thereon. This prevents the cam from twisting out of its seat.

The adapter may further comprises a base which, in use, i.e. when mounted to the frame, extends into a length direction of the frame, wherein the base comprises at least one screw seat, for fastening the adapter there through onto a brake caliper connection of the frame, such that the adapter through hole is aligned with the through hole in the drop out. Optionally, the adapter through hole is aligned with a resting position of the thru-axle in the drop out recess. The brake caliper connection may be a screw connection, such as with an M5 bolt. By fastening the adapter to the brake caliper connection no modifications need be made to the frame of the bicycle.

The assembly may comprise a fixable angularly adjustable connection for adjusting an angle with which the adapter is fixed the frame. The angle can be adjustable to allow the adapter through hole to be aligned with a through hole or rounded end of a shaft mounting slot in the drop out. Alternatively, or additionally, the angle can be adjustable such that the part of the inner support surface that supports the upper tooth surface of the cam is, in use, angled with respect to a horizontal plane which is smaller than a drop out angle of the shaft in the frame with respect to the same horizontal plane. This allows insertion and removal of the wheel with greater ease as the cam is guided into position under any angle greater than the angle which the inner support surface makes with respect to said horizontal plane. The horizontal plane can here be understood to be the horizontal plane with the bicycle in upright position.

According to an aspect is provided a rear axle assembly, comprising a torque support assembly according to any of the preceding claims, a wheel hub, and a sprocket or a plurality of sprockets rotatably mounted to the hollow shaft. The hub is rotatably mounted to the hollow shaft and the sprocket(s) are arranged for driving the hub in rotation.

Optionally, the rear axle assembly comprises a transmission between the sprocket or plurality or sprockets and the wheel hub shaft. The transmission comprises at least two selectable drives between the sprocket(s) and the hub. Hence, additional gear ratios can be provided. For instance the transmission can include a planetary gear set having a first, second and third rotational body. The first rotational body can be a ring gear, the second rotational body can be a planet carrier, and the third rotational body can be a sun gear. The ring gear can be connected to the sprocket(s) and the planet carrier can be connected to the hub. Alternatively, The ring gear can be connected to the hub and the planet carrier can be connected to the sprocket(s). In a first mode the ring gear and the planet carrier are rotationally fixed relative to each other, the transmission operates according to a first gear ratio (such as unity). The sun gear may in that case freewheel relative to the hollow shaft. In a second mode, the ring gear and the planet carrier are not rotationally fixed relative to each other, and the sun gear transfers torque to the hollow shaft, such that the transmission operates according to a second gear ratio (such as 0.5-0.9, e.g. about 0.7). Hence, the transmission can be arranged to transfer torque to the hollow shaft. The transfer of torque requires a proper of transfer of torque from the hollow shaft to the frame, which can be achieved through the cam and adapter.

The transfer of torque from the hollow shaft via the cam to the adapter results in a support force on the adapter and a reaction force. This reaction force can hereby be supported on the frame.

The adapter may be arranged for supporting the torque onto the frame via a screw connection, such as via washers, in particular spherical or conical washers. Spherical washers come in sets having a first washer with a concave side and a second washer with a matching convex side. This allows the torque force to be supported e.g. on the brake mount via the adapter.

The upstanding wall may partly extend around the adapter through hole such that opposing parts of the supporting surface around the adapter through hole diverge from each other in a downward direction. This allows the support surface to act as a guiding surface for guiding the cam towards its correct mounting position. Additionally, the opposing parts of the supporting surface may diverge with an angle which is greater than an angle with which opposing edges of the drop out recess diverge. This allows the cam to orient itself in the adapter regardless of the angle under which it is presented to the adapter within a 180 degree range of rotation.

Optionally, the adapter comprises a boss extending from the second face arranged for resting in the dropout recess. This allows the nesting of the adapter in the drop out recess. Additionally, the upstanding wall and boss may merge at the base of the adapter, such as towards the screw seat. This allows for an increased strength of the base through which the torque is supported on the frame. This increases the durability of the adapter.

The adapter may be a monolithic element. Similarly, the cam may also be a monolithic element. Also, the adapter and the cam may be rigidly connected or connectable, e.g. integrally formed into a single body.

The cam and/or adapter may be made of one of stainless steel, aluminum, aluminum alloy, titanium, and titanium alloy. However, other materials can be contemplated, such as engineering plastics, surface treated steel, or the like.

Optionally, the cam and/or adapter is made of a combination of reinforced plastic and a metal, such as stainless steel, aluminum, or an alloy.

The cam hole may comprise spline teeth for interlocking with spline teeth on an outer surface of the shaft.

Optionally, the assembly is arranged for being clamped to the frame by the thru-axle. Optionally, the assembly is arranged for being clamped to the frame via a clamping end of the thru-axle.

The adapter can designed to have an installation height of 20-30 mm, such as 25 mm.

Optionally the at least two selectable drives of the transmission can be selected by an electrically actuatable actuator. Thereto, the electrically actuatable actuator can be arranged on the wheel axle. A rider operable shift control unit, e.g. mounted at the handlebars or frame of the bicycle, can be used for generating a shift signal. The actuator can be controlled on the basis of the shift signal. Hence, the actuator can include an electrical component arranged on the wheel axle which is configured to be controlled by the shift signal.

Optionally, the cam or the adapter holds a wired or wireless receiver, and/or an antenna therefor, for receiving the shift signal. The wired or wireless receiver can be arranged for receiving the shift signal from the rider operable shift control unit. The cam or the adapter can include an electrical power storage, such as a battery. The power storage can be connected to the wired or wireless receiver.

Optionally, an electrical connection is arranged between the adapter, the cam, the thru-axle and/or the wheel axle. Thus the shift control signal, or a signal associated with the shift control signal, can be communicated from the cam, e.g. from the wired or wireless receiver, to the actuator on the wheel axle, e.g. via the thru-axle and the wheel axle. Alternatively, the shift control signal, or a signal associated with the shift control signal, can be communicated from the adapter, e.g. from the wired or wireless receiver, to the actuator on the wheel axle, e.g. via the cam and/or thru-axle and/or wheel axle.

Optionally, a detachable electric connection is provided between the cam and the actuator. Optionally, a detachable electric connection is provided between the adapter and the actuator. The detachable electric connection can be provided between the wired or wireless receiver and the actuator According to an aspect electric power and/or information is provided to the electric component in or attached to the wheel axle via a contact or contactless electric coupling.

According to an aspect the cam and/or the adapter is used for providing the contact or contactless electric coupling between the electric component in or attached to the wheel axle and the power supply and/or control element.

Optionally, the cam or the adapter is provided with a first transmitter for transmitting electric power and/or signals to the wheel axle. The wheel axle can be provided with a first receiver for receiving electric power and/or the signals from the first transmitter.

Thereto the cam or the adapter can be provided with a first coil as part of the first transmitter and the wheel axle can be provided with a second coil as part of the first receiver. The first and second coils can be sealed against debris and/or water. The first and second coils are positioned such that when the wheel axle is in the position for securing the wheel in the frame, the first and second coils are axially positioned relative to each other such that a coupling can be achieved at high efficiency, e.g. at maximum efficiency. It will be appreciated that the coils will be coupled inductively. However, since the inductively coupled coils are able to transmit electric power and/or electric signals from one coil to the other, the coupling between the coils is herein also referred to as electric coupling.

Optionally, the first transmitter is wiredly or wirelessly connected to the control element.

For increasing efficiency of the transfer of power and/or signal between the coils a middle frequency resonance of the signal on the order of 100 kHz can be used over the coils.

According to an aspect, the system is arranged for transferring both power and signal between the coils, in one direction or in both directions.

Alternatively, the thru-axle is provided with the first transmitter for transmitting electric power and/or signals to the wheel axle. Thereto the thru-axle can be provided with a first coil as part of the first transmitter. The first transmitter of the thru-axle can be connected to the receiver in the cam or the adapter, e.g. via a wired electrical connection.

Optionally, the cam or the adapter includes an actuator controller arranged for controlling the actuator. In that case directing a driving signal to the actuator may suffice. The driving signal can e.g. be a positive or a negative dc current for driving the actuator for up-shift or down-shift, respectively, or vice versa.

According to an aspect a first energy storage element, such as a battery, is included in or attached to adapter, cam and/or thru-axle. A second energy storage element, such as a battery, can be included in or attached to the wheel axle. The first energy storage element can be arranged for providing the first coil with energy. The second energy storage element can be arranged for providing the second coil with energy.

Optionally, the first energy storage element has a storage capacity that is at least ten (10) times the storage capacity of the second energy storage element.

Optionally the system is arranged for charging the second energy storage element using energy stored in the first energy storage element. Hence, the second energy storage element can be maintained in a state of sufficient charge.

Thereto energy can be transferred from the first energy storage element to the second energy storage element via the first and second coils.

The system can be arranged for providing energy to an actuator and/or sensor included in or attached to the wheel axle from the second energy storage element. The system can be arranged for providing energy to an actuator and/or sensor included in or attached to the wheel axle from the first energy storage element. This can also be done via the electrical contacts.

The system can be arranged for transferring a signal determining an actuation direction and/or amount for the actuator included in or attached to the wheel axle via the first and second coils, or via the electrical contacts. The system can be arranged for transferring a signal from the control element (e.g. on the handlebars) to the adapter, cam and/or thru axle. Signal transfer from the control element (e.g. on the handlebars) to the adapter, cam and/or thru-axle can be wireless. A second wireless receiver or transceiver can be included in or attached to the adapter, cam and/or thru-axle. The second transceiver or receiver is herein further referred to as second receiver, nevertheless still covering the possibility of it being a transceiver. The second wireless receiver can be mounted to the adapter, cam and/or thru-axle so as to extend outside the wheel axle to reduce disturbance of wireless communication by metal parts of the wheel axle and/or frame. The system can be arranged for providing the second receiver with electric power from the first energy storage element.

It will be appreciated that when exchanging the wheel (and thus the wheel axle), the adapter, cam and/or thru-axle can remain with the frame so that a pairing between the control element and the second receiver in/on the adapter, cam and/or thru-axle can be maintained. Therefore, when exchanging the wheel no time is lost on pairing the control element with the replacement wheel.

The pairing of the control element, e.g. of a wireless transmitter of the control element, with the second receiver in/on the adapter, cam and/or thru-axle can be performed, e.g. once when matching the adapter, cam and/or thru-axle with the frame.

It will be appreciated that it suffices to recharge the first energy storage element, e.g. by external charging, e.g. using an electric charging apparatus. The second energy storage element can be charged from the first energy storage element. Since the first energy storage element is included in or attached to the adapter, cam and/or thru-axle, it can easily be charged e.g. via a connector on the adapter, cam and/or thru-axle. Charging can be performed while leaving the adapter, cam and/or thru-axle in the bicycle or with the adapter, cam and/or thru-axle removed from the bicycle. Optionally, the first coil can be used for charging the first energy storage element, e.g. via an external charger, e.g. including a third coil.

The system can be arranged such that the first energy storage element automatically charges the second energy storage element so that the second energy storage element can always provide the actuator with electric power. In this way also the user never needs to charge or replace the second energy storage element. This provides a big advantage as the second energy storage element can be difficult to reach since it may be mounted in or attached to the wheel axle, and because parts in the neighborhood of the second energy storage element can rotate (e.g. wheel hub and/or driver).

According to an aspect an electric generator is included in or attached to the wheel axle for charging the second energy storage element. The generator can be driven by rotation of the hub and/or driver. Alternatively, or additionally, the generator can be arranged for generating electric energy on the basis of vibrational energy.

Optionally the first energy storage element includes one or more, such as two, AAAA (LR61) batteries that can be rechargeable and/or replaceable.

According to an aspect a control unit can be included in or on the adapter, cam and/or thru-axle. The control unit can be arranged for receiving control signals from the control element. The control unit can be arranged for converting input signals received from the control element into signals to be transmitted to the first receiver. The control unit can be arranged for indicating a current direction and/or current level to be transmitted by the first transmitter to the first receiver.

According to an aspect an actuator control unit is included in or attached to the wheel axle for controlling the actuator of the wheel axle. The actuator control unit can be arranged for controlling an electric current direction and/or an electric current amount and/or an electric current duration to the actuator. The actuator control unit can also be arranged for controlling a current, e.g. limiting a current to the actuator.

Optionally the actuator control unit is mounted on and/or in the adapter, cam and/or thru-axle.

Optionally the actuator control unit is connected via first electrical contacts on the cam and/or thru-axle to second electrical contacts on the wheel axle.

Optionally there is no second energy storage on the wheel axle.

Optionally, the one or more of the actuator, the actuator control unit, the second coil and the second energy storage element are mounted to a bracket, the bracket forming part of or being connected to the wheel axle. Hence, the electronics can easily be mounted to the wheel axle.

Optionally, the first receiver is powered with electric power received from the first transmitter. Even then, the second energy storage element can be present for providing electric power to the electric component, such as the actuator for gear shifting.

Optionally, the first transmitter is mounted to a dropout of the frame. Alternatively, if a rear derailleur is available, the first transmitter can be mounter to the rear derailleur.

The control element can be an electronic switch actuatable with a rotary button or push button. Optionally, the electronic switch is arranged to be actuated via a cable extending from a mechanical switch (shifter), e.g. mounted on the handlebars. Hence, standard mechanical switches (shifters) can be used for actuating the electric component on/in the wheel axle.

Optionally, a connection between the control element, e.g. the electronic switch, and the first transmitter is a wired or wireless connection. The power supply element for power supply of the first transmitter can be mounted adjacent to the first transmitter, adjacent to the switch or somewhere in between, e.g. inside the frame of the bicycle.

By using a short range wireless system for the first transmitter and first receiver, no pairing of the first transmitter and first receiver is required. Any wheel, with a first receiver, that is placed in the frame can immediately be controlled by the first transmitter and first receiver, without a pairing procedure. This can be of great advantage for a fast wheel exchange. Similarly, providing the electrical contacts between the cam and/or thru-axle and the wheel axle provides that no pairing procedure is required.

In case an electrically switching rear derailleur is used, the first transmitter of the short range wireless system can be placed close to an electric component, such as an actuator, of the rear derailleur. In case the rear derailleur is also actuated wirelessly, a third receiver of the rear derailleur can be placed in one housing together with the first transmitter of the short range wireless system and/or with the actuator control unit. A battery used for the rear derailleur can then supply power to the third receiver of the rear derailleur, the actuator of the rear derailleur and the first transmitter of the short range wireless system and/or the actuator controller, and even to the electric component. Hence, fewer batteries are required.

According to an aspect the electric component has only two modes between which can be switched. The electric actuator can e.g. have only two positions between which can be switched. Optionally, the component is arranged such that the switching direction is determined by an electric current direction (or voltage polarity) to the component. Hence it can be possible to switch from one mode to the other by reversing the current direction (or voltage polarity). Hence, a separate control signal may not be required for determining the switching direction.

According to an aspect, the invention provides for a torque support assembly, for supporting a torque of a hollow shaft onto a frame of a bicycle, comprising: a cam comprising a cam through hole for receiving therein a distal end of the shaft, wherein the cam through hole and the shaft are interlockingly shaped for rotationally locking the cam and shaft with respect to each other; an adapter comprising a first face defining a seat for the cam, a second face, opposite the first face, for being inserted therewith into a recess of a drop out of the frame, and an adapter interface through hole which extends from the seat on the first face and is to the second face coaxial with the cam through hole for allowing a thru-axle to extend there through; wherein the adapter is fixable to the frame and comprises an upstanding wall, extending outward from the first face, defining an inner support surface of the seat on which the cam is supported against rotation.

According to an aspect, the cam and the adapter are rigidly fixed, or fixable, to each other. For example, the cam and the adapter may be integrated to form single torque support body.

According to an aspect, a torque support device is provided, for supporting a torque of a hollow shaft onto a frame of a bicycle. The torque support device comprises a cam hole for receiving therein a distal end of the shaft, wherein the cam hole and the shaft are interlockingly shaped for rotationally locking the torque support device and the shaft with respect to each other; a through hole extending, coaxially with respect to the cam hole, through the torque support device for allowing a thru-axle to extend therethrough; and a base extending from a remainder of the torque support device in a direction transverse to the direction in which the through hole extends, the base being arranged for engaging the frame of the bicycle so as to support torque thereon. Hence, the torque support device can support torque on the frame of the bicycle in at least one rotation direction about the longitudinal axis of the hollow shaft. A torque applied to the hollow shaft can be transmitted to the torque support device, wherein the torque support device in turn transmits the torque through the base to the bicycle frame. In other words, the torque support device blocks a rotation of the hollow shaft, being lockingly engaged in the cam hole of the support device, by engaging the frame with the base of the support device. Hence, the base of the torque support device may form a lever arm with respect to a rotation axis of the hollow shaft. The base can be arranged for engaging the frame of the bicycle outside the dropout. Thus the base can support torque on the part of the frame not being the dropout.

The cam and the adapter as described herein, can for example be integrated, e.g. rigidly coupled to each other, to form the torque support device. It will be appreciated that any of the features and options described in view of the torque support assembly apply equally to the torque support device.

The torque support device may be constructed as a single body, e.g. made of stainless steel, aluminum, aluminum alloy, titanium, titanium alloy or a combination thereof. Other materials can be contemplated, such as engineering plastics, surface treated steel, or the like.

Optionally, the torque support device is configured to be nested in a dropout recess of the frame of the bicycle. The torque support device is for example configured complementary to a shape of the dropout recess. It is also possible that the torque support device is configured not complementary to the shape of the dropout recess to avoid transfer of torque at the dropout recess.

Optionally, the torque support device comprises a first face for facing the hollow shaft, and a second face for facing a dropout recess, wherein a boss, extending from the second face, is configured for resting in the dropout recess.

Optionally, the base comprises an abutment surface arranged for abutting the bicycle frame. The abutment surface may be arranged at a lateral side of the base at or near an open end of the base.

Optionally, the abutment surface is configured for abutting a disc-brake mount connector, e.g. a bolt. The abutment surface is for example recessed with respect to the base, for accommodating the bolt at least partly in the recess of the base. The base may be affixed to the frame, e.g. by means of the same connector as the disc-brake is coupled to the frame. However, the torque support device need not affixed to the frame. For instance, the base may only abut against the frame to prevent a rotation of the hollow shaft in an intended rotation direction. This rotation direction may be associated with forward driving direction of the bicycle, and/or a driven rotation direction exerted by a cyclist to drive the bicycle rear wheel. In an opposite rotation direction, the hollow shaft may not be expected to exert a large torque on the torque support device. A rotation in the opposite direction can for example be prevented by an axial clamping force, clamping the hollow shaft between two opposite dropouts. The friction associated with this axial clamping forces may be sufficient to prevent a rotation of the torque support device in said opposite direction. The clamping force may be established by the thru-axle that is provided through the through hole of the torque support device and through the hollow axis, and is arranged to engage the bicycle frame at the dropouts. The thru-axle may thus clamp the torque support device between one of the dropouts and the hollow shaft.

Optionally, the abutment surface is spaced a distance from a center of the cam hole e.g. 60-90 mm, in particular about 70 mm or 80 mm, and/or corresponding to a distance of either a 140 mm and/or 160 mm disc brake mount position. For example, the abutment surface is spaced a distance from a center of the cam hole corresponding to a distance at which a 140 mm and/or 160 mm disc brake mount connector, e.g. a bolt, is spaced from the cam hole center.

It will be appreciated that any of the aspects, features and options described in view of the torque support device apply equally to the torque support device, and vice versa. For example, the torque support device may hold the wired or wireless receiver for receiving the shift signal. The wired or wireless receiver can be arranged for receiving the shift signal from the rider operable shift control unit. Also, the torque support device can include an electrical power storage, such as a battery. The power storage can be connected to the wired or wireless receiver.

A further aspect provides a wheel securing device for securing a wheel to a bicycle frame, comprising a thru-axle that is engageable with a dropout of the bicycle frame; wherein the thru-axle is provided, at a proximal end thereof, with a thru-axle handle, and, at a distal end thereof, with a threaded tip having a first external thread for engaging a complementary internal thread of the dropout, wherein the threaded tip is detachably coupled to the distal end of the thru-axle. The handle may be used to provide the thru-axle through the holes in the front or rear dropouts of the bicycle frame and through a corresponding front or rear wheel hub, so as to secure the wheel to the frame. At the distal end of the thru-axle, the tip can be screwed into the dropout. The handle may extend substantially transverse to the axial direction of the thru-axle, to facilitate the screwing of the thru-axle into the dropout. The threading and dimensions may vary, however, between bicycle frames. By providing a detachable tip, a single thru-axle can be made compatible for various bicycle frame dropout. The tip can for instance be exchanged with another, different, tip that is compatible with another, different, bicycle frame dropout. Moreover, the tip may be detached from the thru-axle while the tip is threaded into the dropout. This way, the angular orientation of the thru-axle with respect to the frame can easily be adjusted. It will be appreciated that the tip can be an insert, bush or other tip detachably couplable to the distal end of the thru-axle.

Optionally, the distal end of the thru-axle comprises an axial spline arranged for cooperating with an axial spline of the threaded tip. Hence, the thru-axle and the tip can easily be coupled to each other, while providing a rigid rotational coupling between thru-axle and the tip. Moreover, in use, when the thru-axle is engaged with the bicycle frame, the angular orientation of the thru-axle can easily be adjusted relative to the frame. This allows the handle to be oriented at a desired orientation relative to the frame, e.g. to minimize aerodynamic drag.

Optionally, the axial splines are configured to provide at least ten distinct relative angular positions between the thru-axle and the tip. Hence, an angular orientation of the thru-axle with respect to the tip can be adjusted with increments of at most 18 degrees. This provides a fine adjustment of the thru-axle orientation and/or the handle orientation, with respect to the frame, in particular with respect to either a chain-stay or a seat-stay of the bicycle frame. Providing at least ten distinct relative angular positions between the thru-axle and the tip enables the handle to be substantially aligned with either the chain-stay or the seat-stay, which typically enclose an angle of about 18 degrees.

Optionally, the tip is rigidly fixable to the thru-axle by means of a connector, such as a, e.g. threaded, connector which extends through an axial through hole of the tip and into an axial bore of the thru-axle. This enables a secure detachable coupling between the tip and the thru-axle.

Optionally, the wheel securing device comprises a further threaded tip having a further external thread different from the external thread of the tip, and wherein the tip and the further tip are exchangeable.

It will be appreciated that the wheel securing device, can be used for securing various wheel hubs and bicycle frames. It will also be appreciated that the wheel securing device can be used in combination with a torque support device as described herein, and/or a torque support assembly as described herein.

According to an aspect there is provided a bicycle comprising the rear axle assembly as described above, a torque support device as described above, and/or a securing device as described above.

It will be appreciated that any of the aspects, features and options described in view of the torque support assembly apply equally to the torque support device, the rear wheel assembly and the bicycle, and vice versa. It will also be clear that any one or more of the above aspects, features and options can be combined.

BRIEF DESCRIPTION OF THE DRAWINGS

Further advantageous aspects of the invention will become clear from the appended description and in reference to the accompanying drawings, in which.

DETAILED DESCRIPTION

Figure 1:
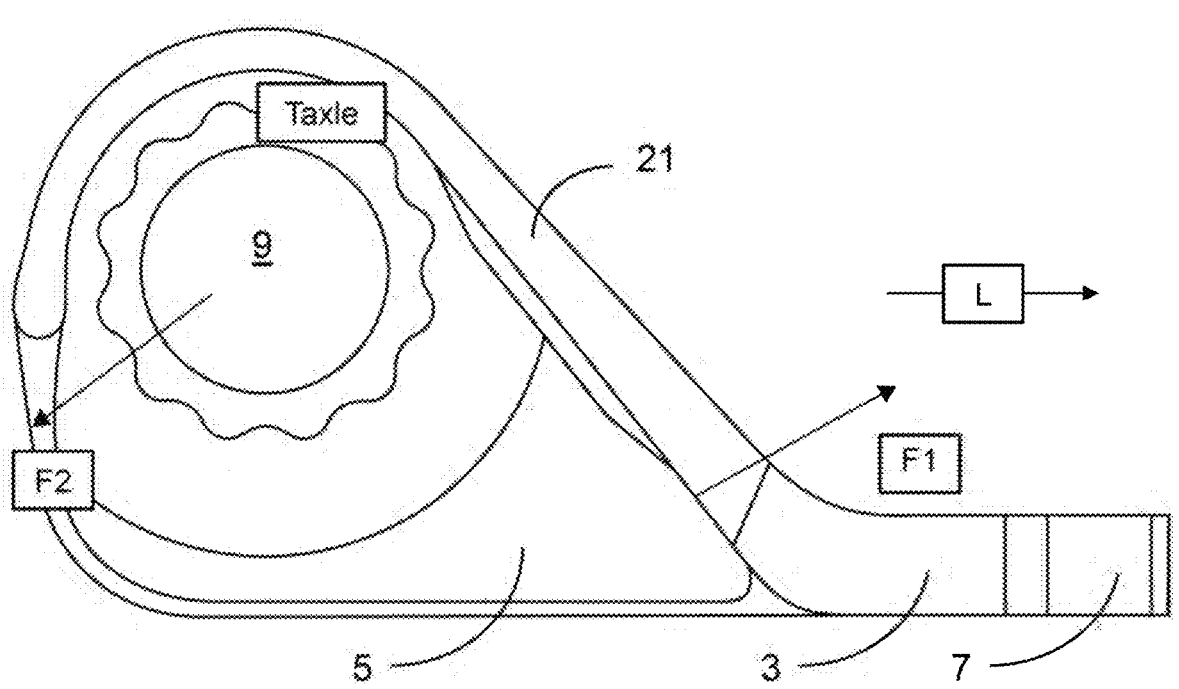
FIG. 1 shows a side view of a torque support assembly.
Figure 2:
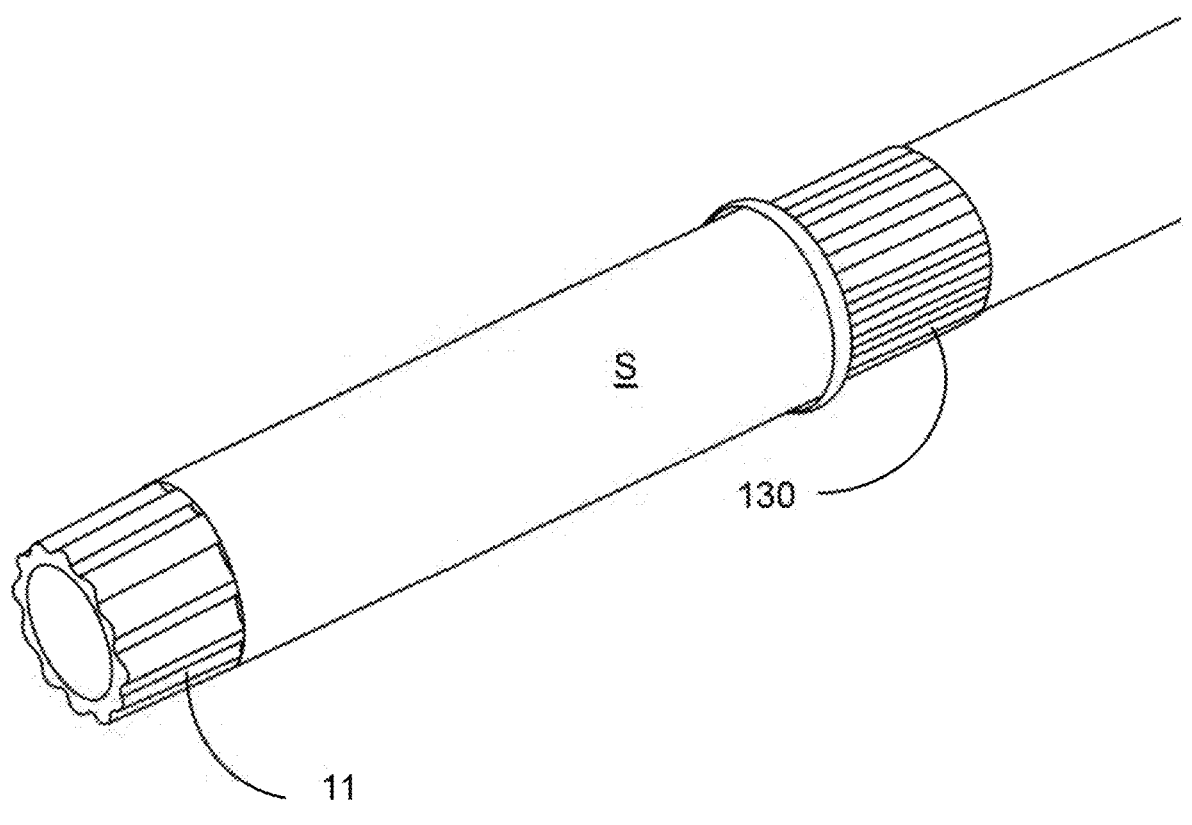
FIG. 2 shows perspective view of a shaft part for connecting to the cam of the torque support assembly.
Figure 3:
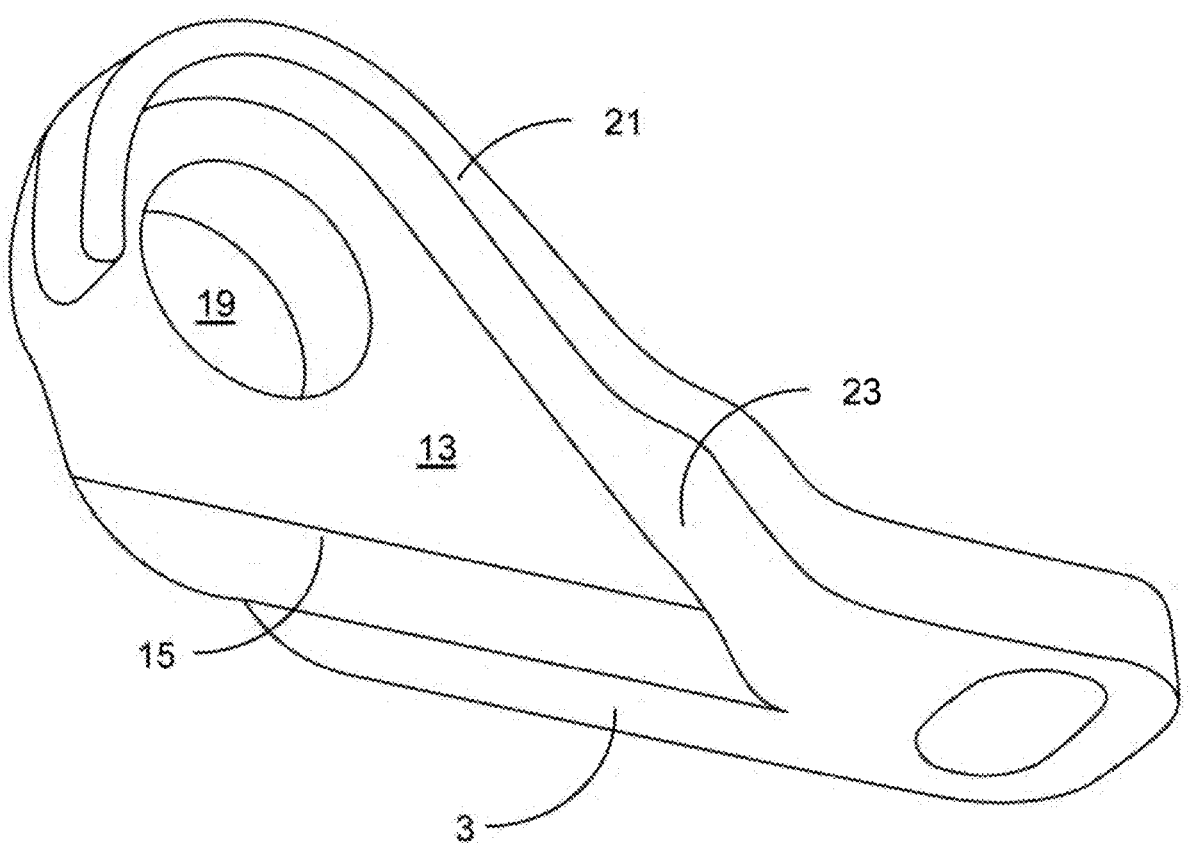
FIG. 3 shows a first perspective view of an adapter of the torque support assembly.
Figure 4:
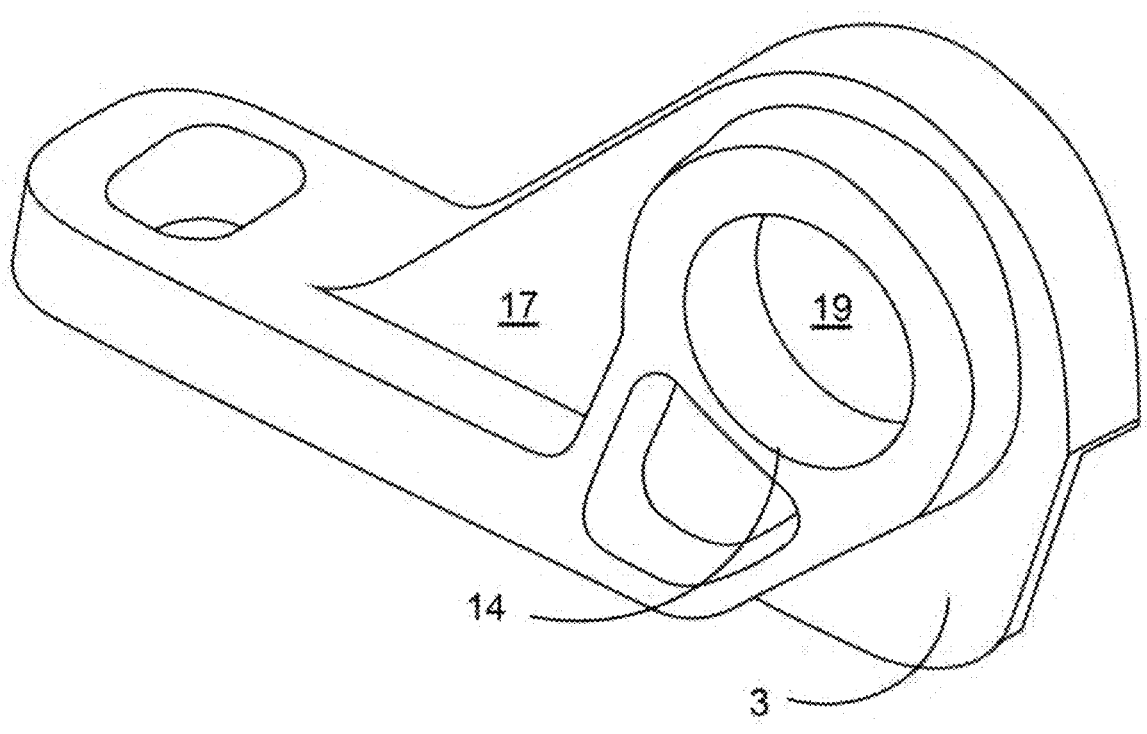
FIG. 4 shows a second perspective view of the adapter of the torque support assembly.
Figure 5:
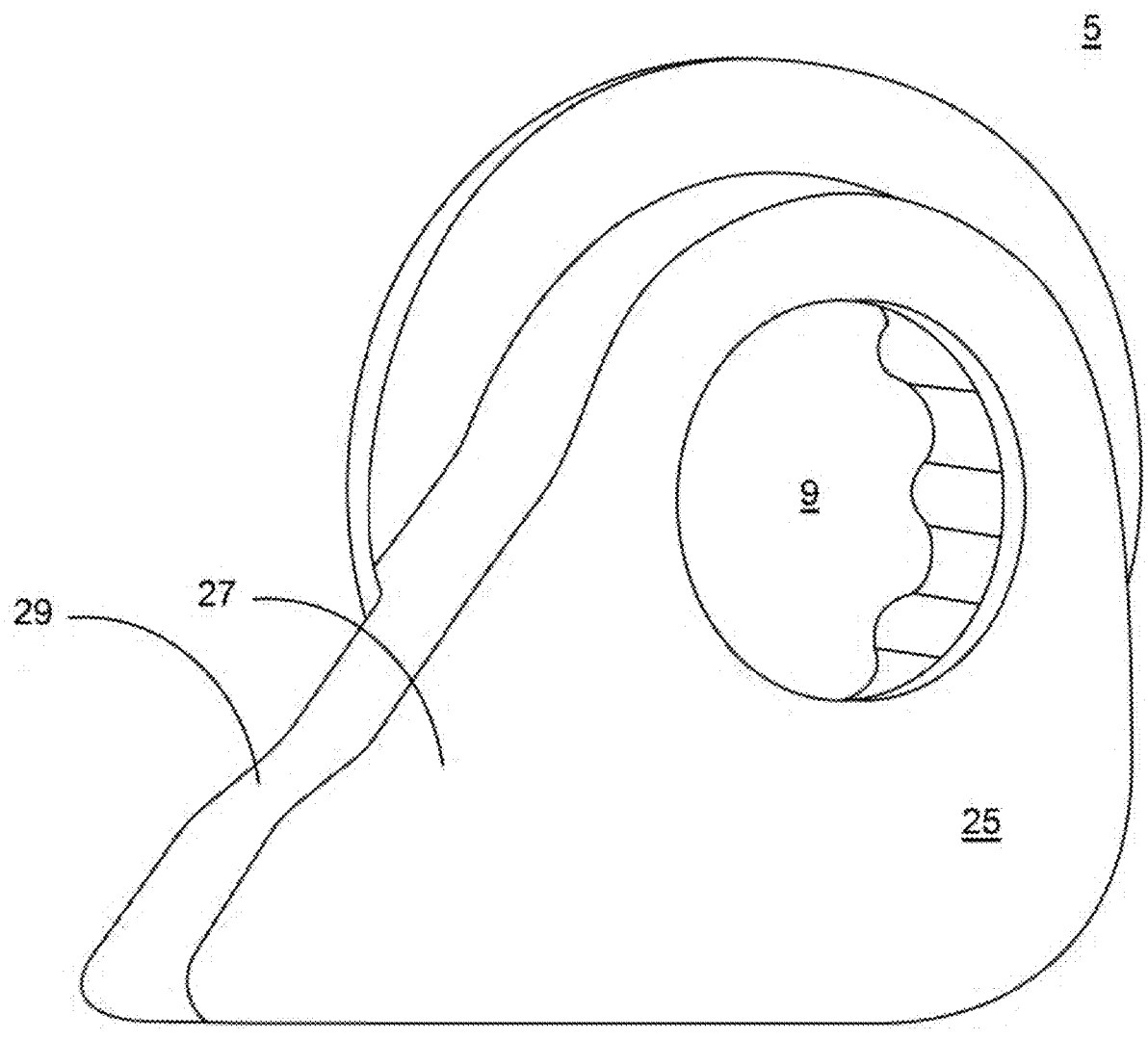
FIG. 5 shows a first perspective view of the cam of the torque support assembly.
Figure 6:
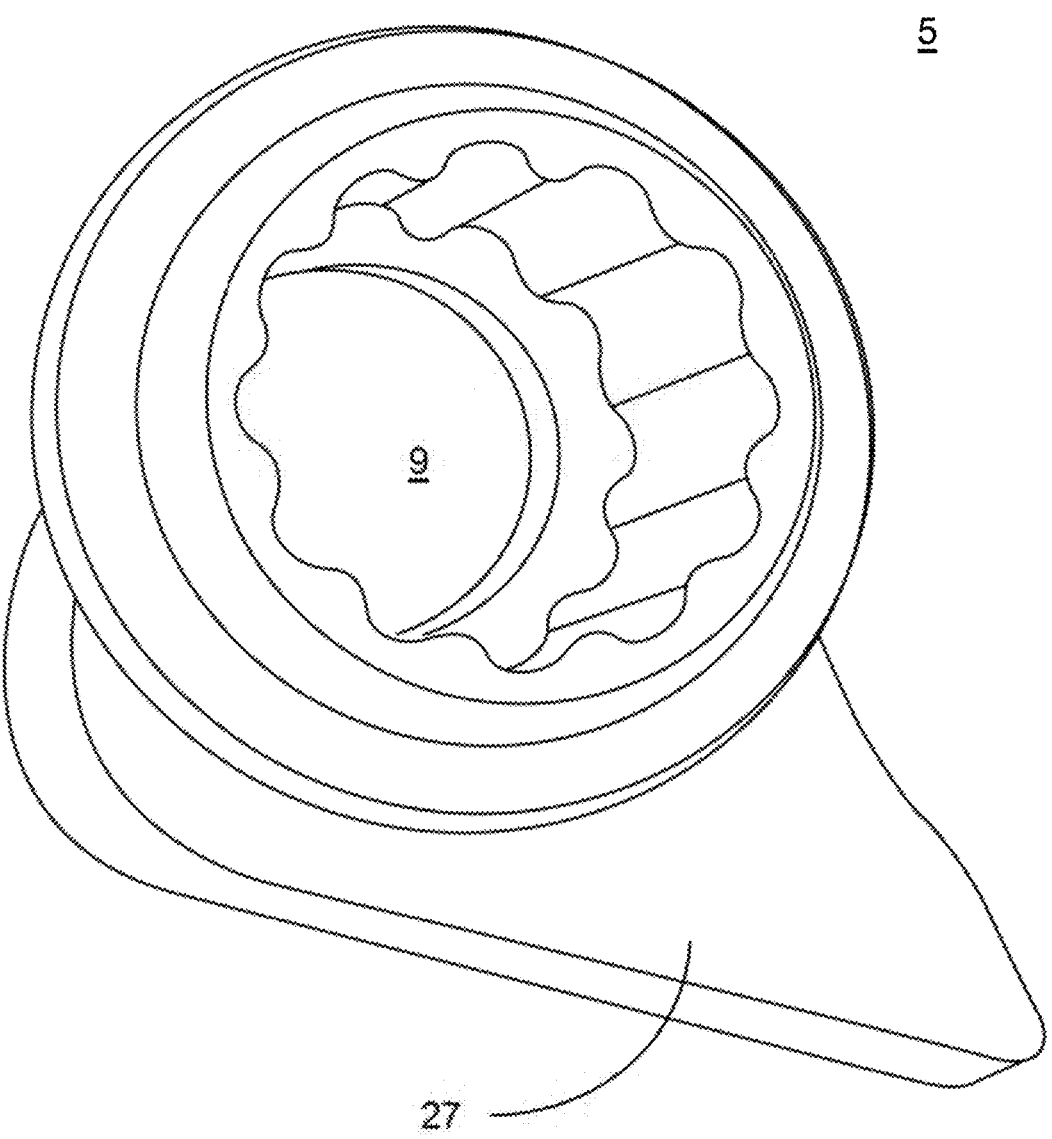
FIG. 6 shows a second perspective view of the cam of the torque support assembly.

FIG. 1 shows an example of a torque support assembly 1, herein also referred to as External Torque Support (ETS) bracket. In the example of FIG. 1 the torque support assembly includes an adapter 3 and a cam 5. The adapter 3 is fixable to the frame of a bicycle via a base 7. In use, the base 7 extends outward in a longitudinal direction L of the bicycle. The cam 5 can be seen to comprise a cam hole 9 for receiving therein a distal end 11 of a shaft S as shown in FIG. 2. The hole 9 and the shaft S are in this example interlinkingly shaped for rotationally locking the cam 5 and shaft S with respect to each other. To this end here the cam hole 9 has spline teeth for interlocking with spline teeth on an outer circumferential surface of the of the shaft S at the distal end 11. The adapter 3 has a first face 13 as shown in FIG. 3. The first face 13 defines a seat 15 for the cam 5. The adapter 3 has a second face 17 as shown in FIG. 4, opposite the first face 13. In this example the second face 17 is arranged for being inserted therewith into a recess 33 of a drop out of the frame. The adapter 3 includes an adapter through hole 19 which extends from the seat 15 on the first face 13 to the second face 17. In mounted condition the adapter through hole 19 is coaxial with the cam hole 9 for allowing a thru-axle to extend there through. The adapter 3 in this example has an upstanding wall 21, extending outward from the first face 13. The upstanding wall 21 defines an inner support surface 23 of the seat 15 against which the cam 5 is supported against rotation when assembled. FIGS. 5 and 6 each show opposite faces of the cam 5. In this example the cam 5 is arranged such that cam hole 9 has a reduced diameter at a seating face 25. The seating face 25 is the face of the cam 5 which is to be seated in the seat 15 of the adapter 3. Due to the reduced diameter the distal end of the shaft 11 is supported in the cam 5, but is prevented from extending beyond the cam 5 to the adapter 3. Here the cam 5 can further be seen as having a tooth 27. The tooth 27 has an upper surface 29 which is arranged to be supported against the inner support surface 23 of the adapter 3. In this example each of the cam 5 and adapter 3 are a monolithic element, here made of metal. In this example the metal is stainless steel, but this may just as well be a titanium or aluminum alloy. It will be appreciated that other materials may be selected for the cam and/or the adapter as well.

Figure 7:
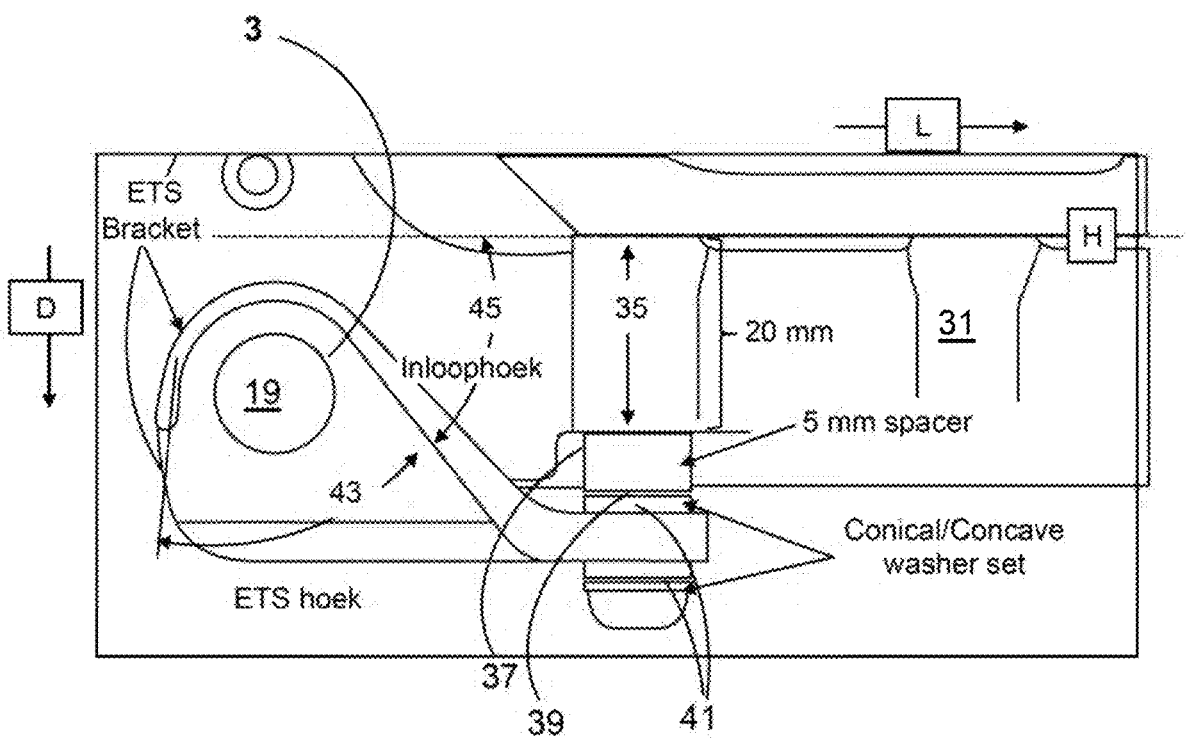
FIG. 7 shows a side view of the adapter mounted to a rear frame part of a bicycle.
Figure 8:
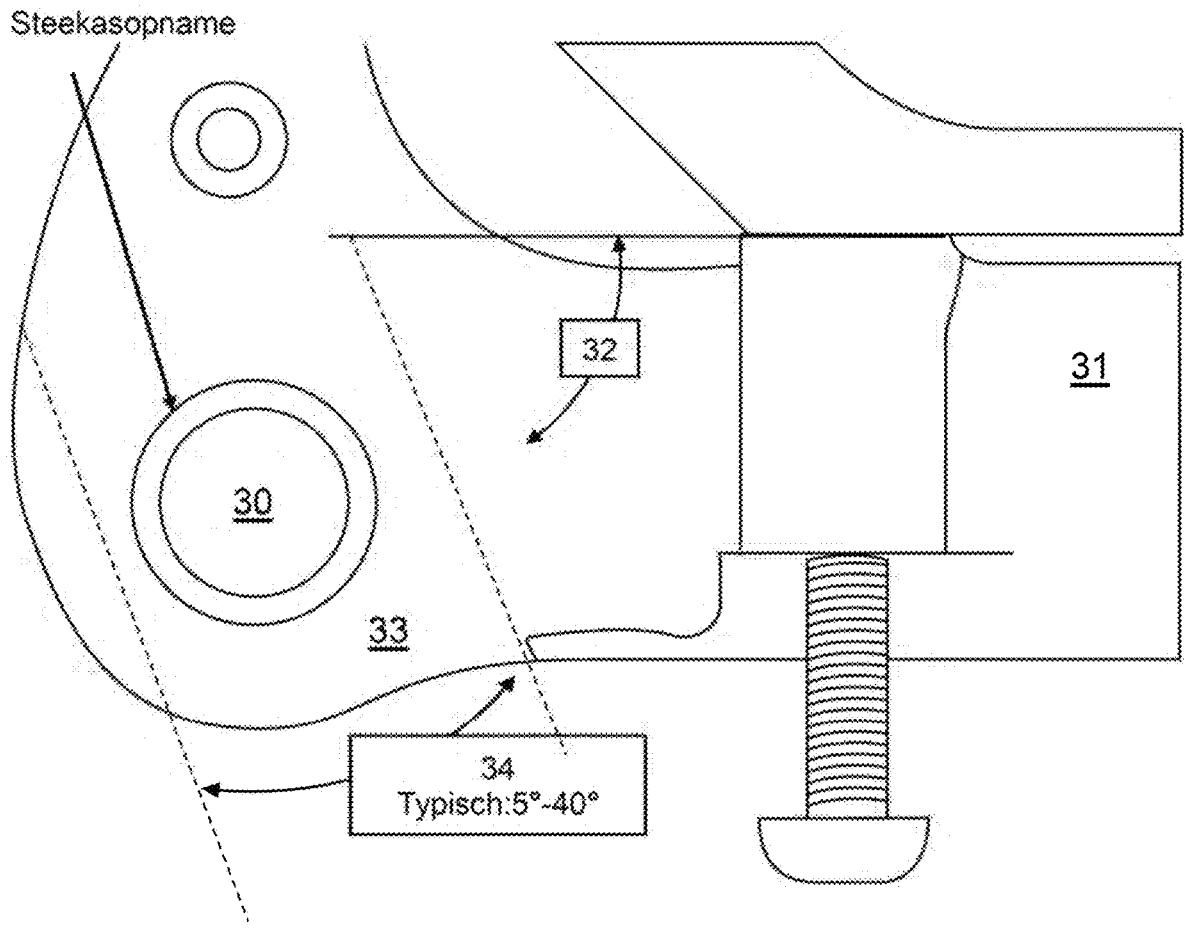
FIG. 8 shows a side view of the rear frame part of the bicycle.

FIG. 7 shows an example of the adapter 3 of the torque support assembly 1 installed on a lower rear end of a bicycle frame 31, here at a drop out. The bicycle frame 31 in this example is compliant with the Flat Mount standard in that it comprises a drop out recess 33 which is visible in FIG. 8. FIGS. 7 and 8 show the same rear end of the bicycle frame 31. In this example a ridge height 35 of brake mounts is 20 mm. In this example the adapter 3 is designed for a ridge height of 25 mm. This is to show that a larger adapter, designed for a 25 mm ridge height, may also fit to rear frame part with a different ridge height such as the one presented in FIGS. 7 and 8. Here the difference in height is compensated for by providing a spacer 39 to a screw connection with the frame 31. It is noted that such a spacer 39 will not be necessary when the adapter is fitted to a frame having a corresponding ridge height of 25 mm. Alternatively the adapter 3 may be designed such that its height is different, such as 15, 20, 25, 30, 35 mm. For ridge heights larger than the adapter height, a bracket (not shown, but customary) can be provided in order to facilitate a connection with the frame such that the adapter through hole 9 becomes aligned with the thru-axle through hole 19 of such a frame 31. Returning to FIG. 4 in this example the adapter 3 has a boss 14, on a face opposite the face defining the seat 13 for the cam 5. The boss 14 is suitable for fitting inside the drop out recess 33, as e.g. shown in FIG. 7. The boss 14 extends around the adapter through hole 9 and downwards toward the base 7 of the adapter 3. In this example, at the base 7 of the adapter 3 toward a foot, or outwardly extending end of the base 7, the boss 14 and the upstanding wall 21 merge. It will be appreciated that in this example the boss 14 has an external shape that differs from an internal shape of the drop out recess 33. As such, in this example the adapter 3 does not transfer torque onto the drop out via the boss 14. Instead, in this example, torque is transferred from the adapter 3 onto the frame via the base 7 and the brake caliper connection 37.

The adapter 3 for 25 mm ridge heights, may be designed to have a weight of about 30 grams, when made of stainless steel. The cam 5 may be designed to have a weight of about 28 grams, when made of stainless steel, or about 10 grams, when made of an aluminum alloy.

It will be understood that a lower surface of the mount of the frame 31 onto which the adapter 3 may be fixed may not follow strict tolerances. To be able to use such lower surface, in particular the brake caliper connection 37 (also herein referred to as a bolt connection), as a stop, the adapter 3 may be skewed or tilted with respect to the frame 31. The term "a stop" here meaning a surface on the frame 31 onto which the adapter 3 may support torque forces as a result of supporting torque forces of the cam 5 and corresponding shaft 11. Difference in height and skew can be compensated for by using spherical or conical washers 39 and spacers 41 added to the bolt connection with a brake caliper connection 37. As such, the adapter 3 can be brought in alignment such that the adapter through hole 9 is coaxial with a hole 30 through the drop out. The adapter 3 can also be aligned such that the base 7 of the adapter 3 extends parallel to the bottom of the frame 31, e.g. the lower surface of the frame. This allows force to be supported across opposing surface of the frame 31 and adapter 3, and can increase durability of the connection.

FIG. 7 shows an ETS angle 43 and minimum angle of entry 45. The ETS angle is defined by the upstanding wall 21. The upstanding wall 21 partly extends around the adapter through hole 19 such that opposing parts of the support surface 23 around the adapter through hole 9 diverge from each other in a downward direction D. The angle of the above divergence is the ETS angle 43. The angle which the forward portion of the support surface 23 makes with respect to a horizontal plane H is herein referred to as the minimum angle of entry 45.

A wheel is normally held between two drop out recesses 33 of the frame 31. The drop outs extend, in use, on opposite sides of the wheel. Each dropout includes a through hole 30 or a slot, e.g. having a rounded end, for allowing a thru-axle to be mounted there through. It s possible that for one wheel a bicycle comprises one torque support assembly 1. The torque support assembly can be positioned on the end of the hollow shaft adjacent the sprocket(s) or on the opposite end. It is also possible that the bicycle includes for one wheel two torque support assemblies, one on either side of the wheel. To this end the shaft S as shown in FIG. 2 may have a second distal end designed the same as the distal end 11 shown therein.

The angle 34 of the downward sloping sides of the dropout recess 33 is such that a hub with disc can be placed without the disc jamming in/against the caliper (the caliper falls "over" and "around" the disc). This dropout angle 34 is fixed at various values for different bicycles.

Figure 10:
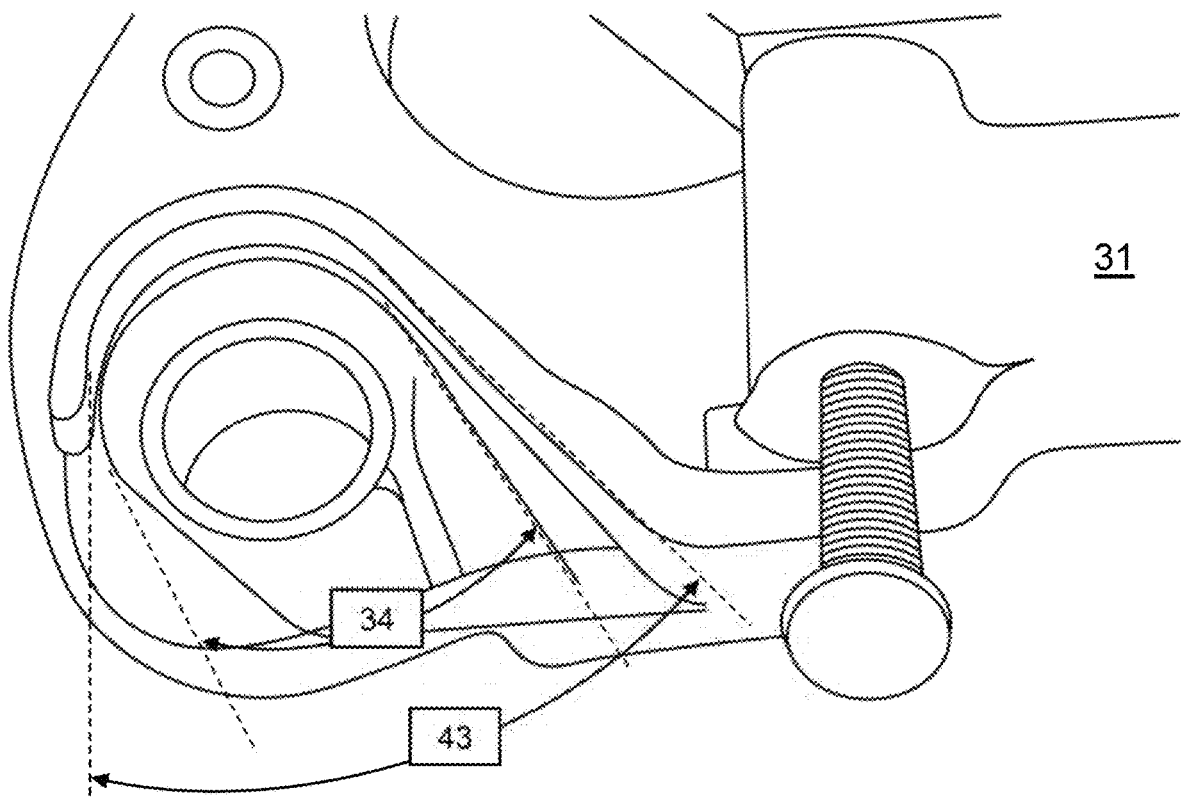
FIG. 10 shows a perspective of the torque support assembly.

By working towards ensuring that the mounting surface of the ETS bracket, also known as the adapter 3 on the frame 31 is always aligned as parallel as possible to the brake mount 37 as shown in FIG. 7, an entry angle 45 in the ETS bracket can be created that is smaller than the dropout entry angle 32 of the frame itself. The total dropout angle 34 for dropout recesses 33 as shown in FIG. 8 varies greatly, e.g. from 5 degrees to 40 degrees. A drop out entry angle 32, different from a dropout insertion angle 34 is also shown in FIG. 8. By choosing the angle 43 of the ETS bracket beyond the range of the dropout insertion angle 34 range, it is ensured that the ETS End Cap, also known as the cam 5, will never give an obstruction to the hollow shaft S when mounting, and at the same time aligns itself as soon as the hollow shaft S reaches its final position. This is represented in FIG. 10, wherein the adapter 3 is made transparent to show the ETS angle 43 with respect to the drop out insertion angle 34.

Figure 9:
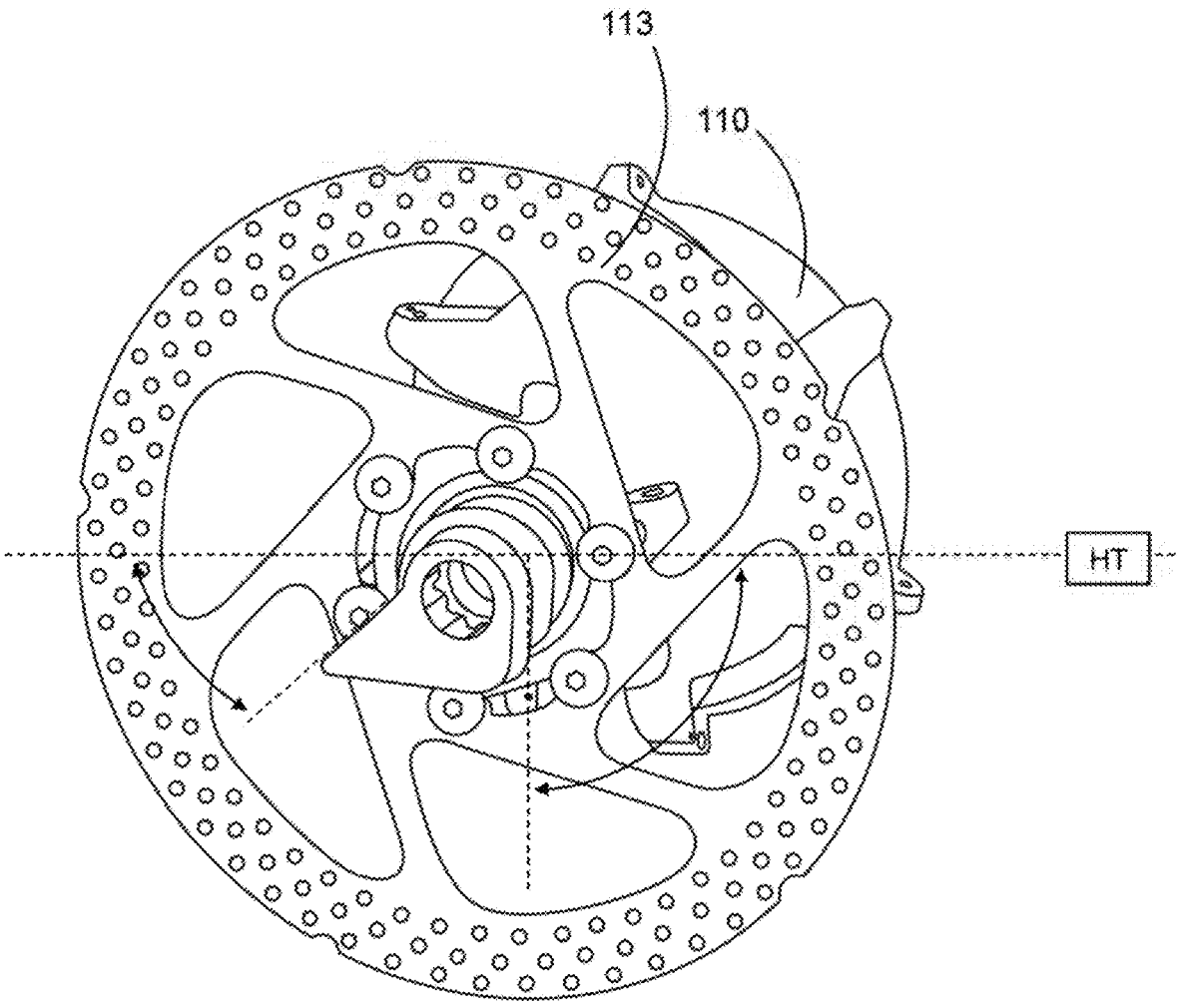
FIG. 9 shows a perspective of a cam, a braking disk, and a gear box axially aligned.
Figure 11A:
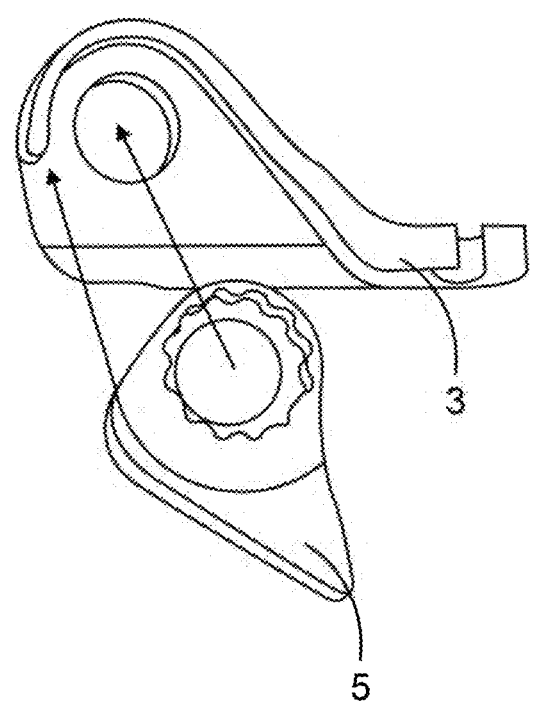
FIGS. 11A and 11B shows perspective views of the assembly.
Figure 11B:
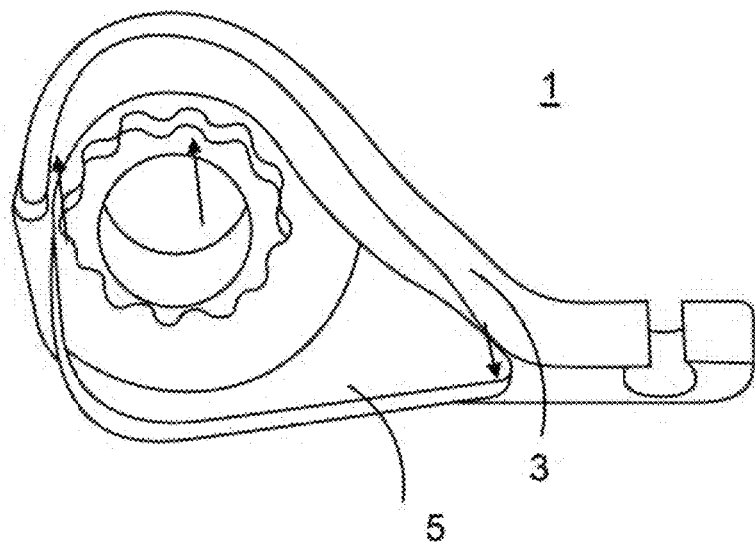

FIG. 9 shows how the orientation of the ETS End cap 5 can very with respect to a horizontal through plane HT to remain guidable into its seat 15 as shown in FIG. 7. The ETS End Cap 5 (cam), aligns itself in the ETS Bracket 3 (adapter), regardless of the angle at which it is offered provided the adapter 3 is presented in a manner concordant with FIG. 9). The alignment can be seen in FIGS. 11A and 11B where the support surface 23 guides the cam 5 into alignment with the adapter 3 such that the cam and adapter through holes 9, 19 are coaxial.

Figure 12:
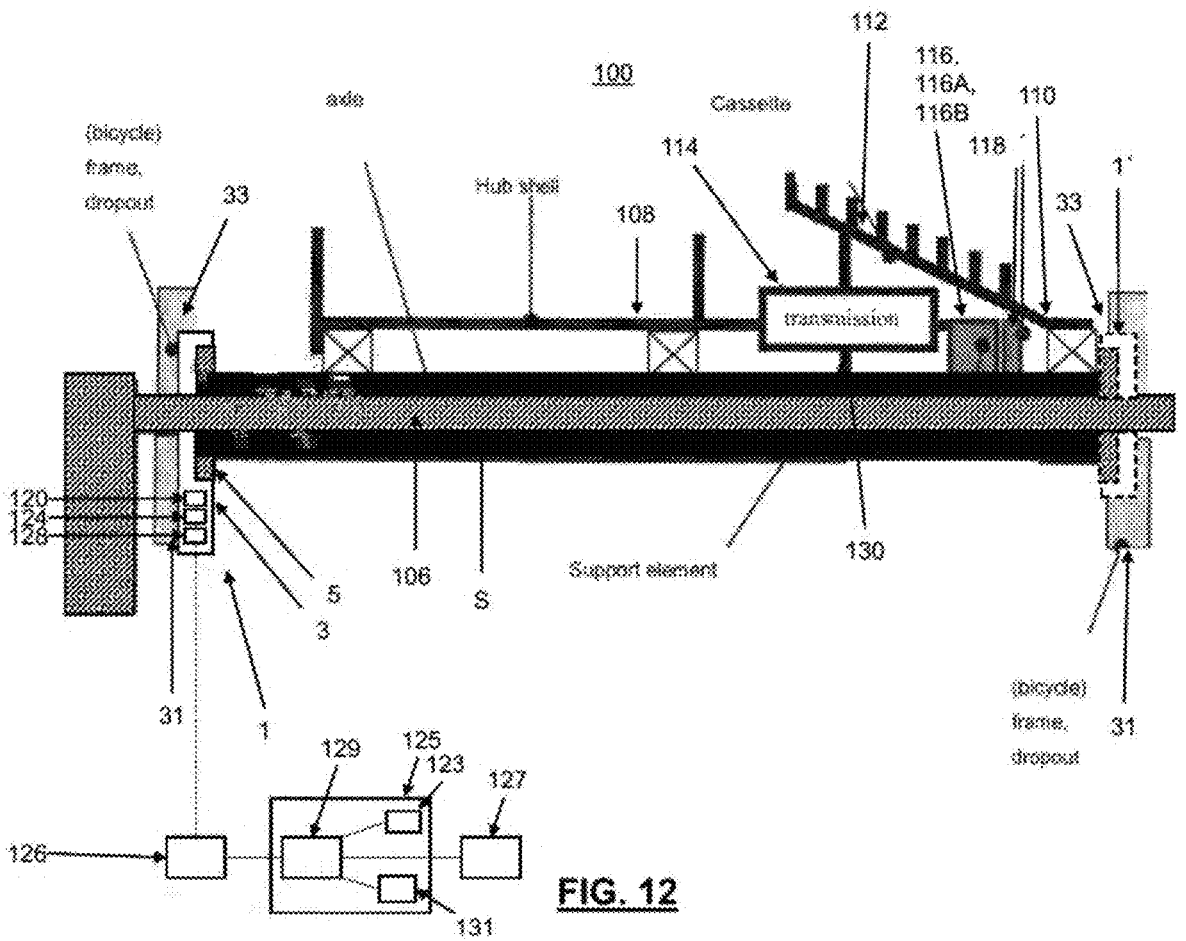
FIG. 12 shows a schematic cross-sectional drawing of a rear axle assembly comprising a torque support assembly.

FIG. 12 shows a schematic cross section of a rear (wheel) axle assembly 100. In FIG. 12 the wheel axle assembly 100 is mounted in a rear frame 31 of a bicycle. The axle assembly 100 is mounted between two dropouts 104 of the frame 31. The wheel axle assembly 100 includes a thru-axle 106 for securing the wheel axle assembly 100 to the frame 31. The thru-axle 106 here is inserted through the hollow shaft S. The torque support assembly 1 is interposed between the dropout 104 and the hollow shaft S on the side opposite the sprockets.

In this example, the wheel axle assembly 100 includes a hub 108. The wheel axle assembly 100 includes a driver 110 for driving the hub in rotation via a transmission 114. Here the driver 110 includes a cassette 112 including a plurality of sprocket gears.

In this example, the driver 110 is connected to the hub 108 via the transmission 114. The transmission 114 is arranged to selectively be in a first mode and in a second mode. In the first mode a transmission ratio of the transmission 114 is different from a transmission ratio in the second mode. Here, in the first mode the transmission ratio is e.g. unity (output rotation speed at the hub equals input rotation speed at the driver). Here, in the second mode the transmission ratio is e.g. a speed reduction (output rotation speed at the hub is smaller than the input rotation speed at the driver). Hence, the transmission can e.g. mimic the functioning of a front derailleur.

In FIG. 12 the wheel axle assembly 100 includes an electric component 116. Here, the electric component 116 is an electric actuator arranged for actuating the transmission to switch from the first mode to the second mode and vice versa. The actuator can e.g. include a processor 116A and a motor 116B. In this example the processor 116A and the motor 116B are both located on or connected to the rotating part, here in the hub 108. It is also possible that the processor 116A and the motor 116B are both located on or connected to the stationary part, here the shaft S. It will be appreciated that it is also possible that part of the electric component, e.g. the motor 116B, is placed on the rotating part, e.g. inside the hub 108 or driver 110 and another part of the electric component, e.g. the processor 116A, is located on the non-rotating part, e.g. on the shaft S, or on or in the cam 5, or on or in the adapter 3. It will be appreciated that the electric component can also e.g. be a sensor, such as a speed sensor, a torque sensor, or the like.

In this example, for operating the electric component 116, here the actuator, a first wireless receiver 118 is placed in the wheel axle assembly 100. Here, the first receiver 118 is placed within the cassette 112, more specifically within the driver 110, e.g. near the actuator 116. A first wireless transmitter 120 is placed on a non-rotating part of the bicycle. Here the first transmitter 120 is placed on or in the adapter 3, or on or in the cam 5. Alternatively, the first transmitter 120 can be placed on the thru-axle 106, bicycle frame, or handle bar. If the wheel including the wheel axle assembly 100 is exchanged the transmitter 120 may remain with the frame. The communication between the first transmitter 120 and the first receiver 118 can be such that it requires no pairing. Hence, a wheel exchange is very simple and fast.

In FIG. 12, the first transmitter 120 is communicatively coupled, here wiredly, with a second receiver 124. Here the second receiver is also placed on or in the adapter 3, or on or in the cam 5. The second receiver 124 is in this example arranged for wirelessly receiving a control signal from a second transmitter 126. The second transmitter 126 can be associated with a manual input module 127, such as a shifter, for shifting gears. The shifter 127 can e.g. be mounted on handlebars of the bicycle. The second transmitter 126 can also be mounted in the handlebars or frame. A controller 129 can include a processor 125 for processing manual input from the module 127. The controller 129 can include indicator means 123 for indicating a status to the user. Hence a user (rider) can trigger transmission of the control signal by actuating the shifter. Alternatively, or additionally, the control signal transmitted by the second transmitter 126 can be automatically generated by a processor, e.g. the processor 125 of the controller 129. The second transmitter 126 can also be arranged to transmit a control signal to another shifting device on the bicycle.

The first transmitter 120 and the second receiver 124 are powered by a battery 128. In this example, the battery 128 is attached to the adapter 3, or on or in the cam 5. It is also possible that the battery 128 is included in the thru-axle 106, e.g. within the hollow shaft S. It is also possible that the adapter 3 and/or the cam 5 is wiredly connected to the controller 129 on the frame. Then the second transmitter 126 and second receiver 124 can be omitted. Also, the battery 128 can be omitted in case the first transmitter 120 then is powered, e.g. wiredly, from the controller 129 (e.g. from a battery 131 of the controller).

Figure 13:
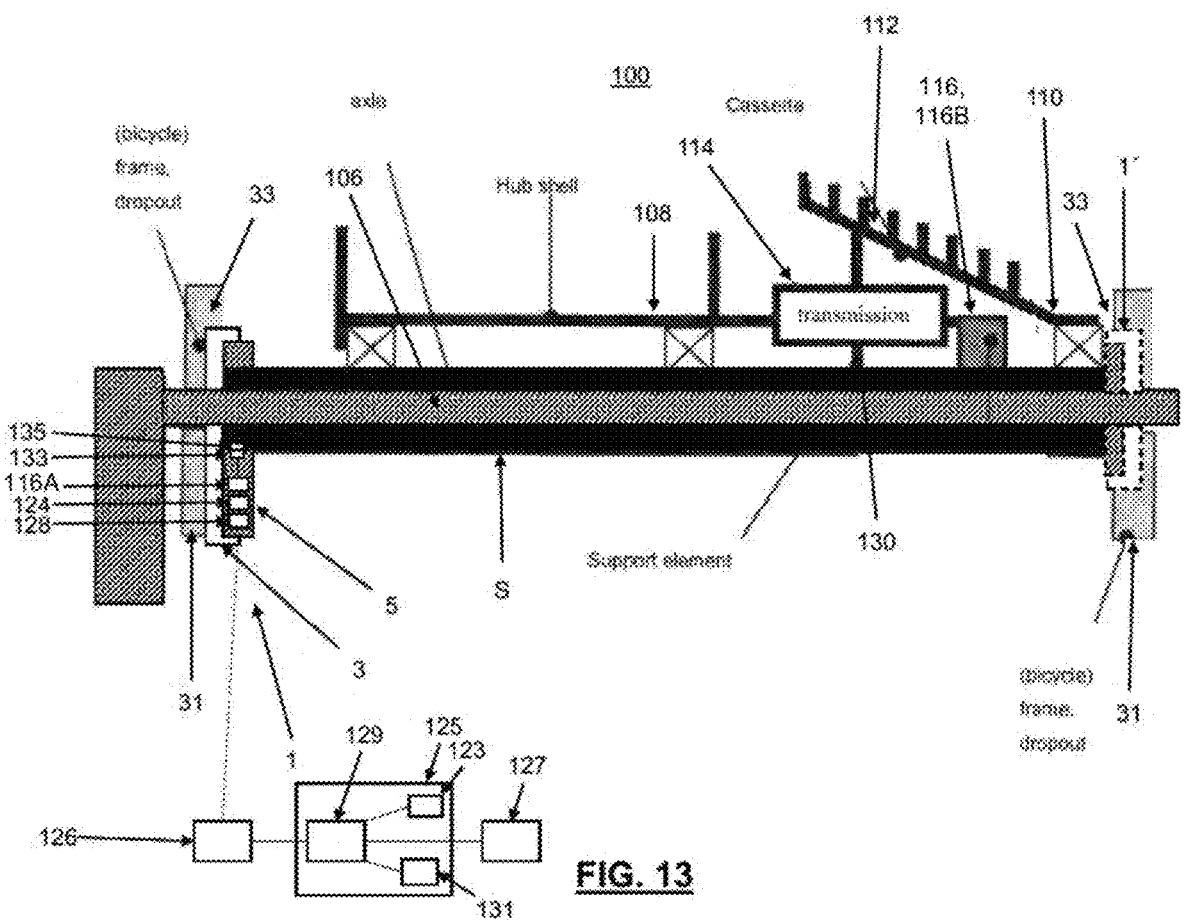
FIG. 13 shows a schematic cross-sectional drawing of a rear axle assembly comprising a torque support assembly.

In FIG. 13 the electric component 116, e.g. the actuator, arranged for actuating the transmission to switch from the first mode to the second mode and vice versa, is wiredly connected to the second receiver 124. More precisely, in this example, the processor 116A is connected to a non-rotating part and the motor 116B is connected to a rotating or non-rotating part of the wheel axle assembly 100. Here, the second receiver 124 and the processor 116A are included in or on the cam 5. The wired connection from the second receiver 124 to the processor 116A is within the cam. It will be appreciated that it is also possible that the second receiver 124 and the processor 116A are included in or on the adapter 3. It will be appreciated that the adapter 3 and the cam 5 can be a unitary part. The wired connection from the second receiver 124 to the processor 116A can be within the cam 5 or in or on the adapter 3, e.g. both the second receiver 124 and the processor 116A can be on the same PCB, in or on the adapter 3, in or on the cam 5, or in or on both.

The wired connection from the processor 116A to the motor 116B here only carries power signals to the motor 116B, here a positive or negative dc current. In this example, the wired connection from the processor 116A to the motor 116B is achieved by a wired connection from the cam 5 and/or the adapter 3 to the hollow shaft S. Thereto the cam 5 may have, first electrical contacts 133 e.g. at the spline teeth at the cam hole 9, and the shaft S may have matching second electrical contacts 135 e.g. at the spline teeth at the distal end 11 of the shaft S. The electrical contacts can be in axial direction or in radial direction between the cam 5 and the shaft S. In this example, when exchanging the wheel, the cam 5 may remain with the bicycle as the cam includes the second receiver 124. The cam 5 can be disconnected from the wheel, e.g. from the shaft S, or it can stay on the bicycle wheel. It can be advantageous, when changing the rear wheel, that the cam 5 with second receiver 124 is disconnected from the wheel and connected to the replacement wheel in order to keep the pairing between the second receiver 124 and the second transmitter 126. It is also possible that the cam 5 is wiredly connected to the controller 129 on the frame. Then the second transmitter 126 and second receiver 124 can be omitted.

Alternatively, the second receiver 124 is included in or on the cam 5 and the processor 116A is connected to the shaft S. The wired connection from the second receiver 124 to the processor 116A is then via the first and second electrical contacts.

Alternatively, the first and second electrical contacts between the cam and the shaft S can be used to provide electrical power to an electrical drive motor inside the hub, the stator of which is also connected to the shaft S. The torque support assembly then prevents also rotation of the shaft S due to the reaction torque of the electric motor.

The transmission 114 is also coupled to the shaft S. The shaft S is prevented from rotating around its longitudinal axis by means of the torque support assembly. The transmission 114 may interact with a support element 130, such as spline teeth, on the shaft S. This allows gear shifting torque to be exerted onto the shaft S which is supported by the torque support assembly 1 onto the frame 31.

FIGS. 14 and 15A-15C show a support device 200. The support device is also referred herein as an External Torque Support (ETS) bracket. The support device 200 is formed by a functional and physical integration of the adapter 3 and the cam 5, which have been described in view of FIGS. 1-13. In the example of FIGS. 14 and 15A-15C, the support device 200 is made up of a single body, having cam hole 9 for receiving the hollow shaft S in a rotationally interlocking manner. Here, the cam hole 9 has spline teeth for interlocking with spline teeth on an outer circumferential surface of the of the hollow shaft S. The support device 200 also comprises a through hole 19 that extends through the support device 200. The through hole 19 is coaxial with cam hole 9 for allowing a thru-axle 106 to extend there through.

A second face 17 of the support device 200 has a boss 14. The boss 14 is suitable for fitting inside the drop out recess 33. The boss 14 extends around the through hole 9. Here the boss 14 is substantially circular, for aligning the through hole 9 with a hole in the dropout 104, and to allow for a rotation of the support device 200 within the dropout recess 33. In a variant of the support device it is possible that the boss 14 has a key shape which matches a key-hole shape in the drop-out. In this case the torque can be fully or partially supported within the key-hole in one or two rotation directions.

The support device 200 also comprises a base 7. The base 7 extends outward from a remainder of the support device 200, in a direction transverse to an axial direction of the through hole 9. The base 7 is arranged to engage the bicycle frame. In use, the base 7 forms a lever arm to support torque that is exerted on the hollow shaft S onto the frame 31. Here, the base 7 engages the chain-stay 310 of the bicycle frame 31, and extends in a longitudinal direction L of the bicycle. The base 7 comprises an abutment surface 201 arranged for abutting the frame 31. The base can be touching directly on the frame and/or the abutment surface 201 can particularly engage a disc-brake mount connector 205, such as in this example, here via a bolt. The base 7, in this example, is not affixed to the frame 31. It will be clear that nevertheless the base 7 can transfer torque onto the frame 31 at least in one rotational direction. It will be appreciated that the base 7 can be affixed, for example bolted, to the frame 31, e.g. by the bolt of the disc-brake mount connector.

Figure 14:
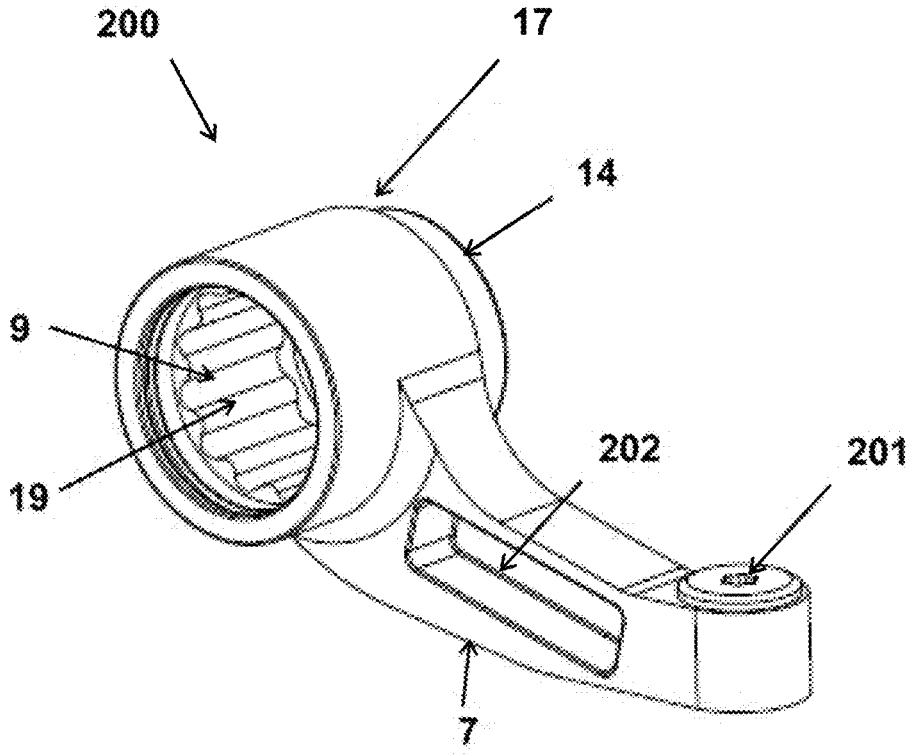
FIG. 14 shows a torque support device.
Figures 15A, 15B, 15C:
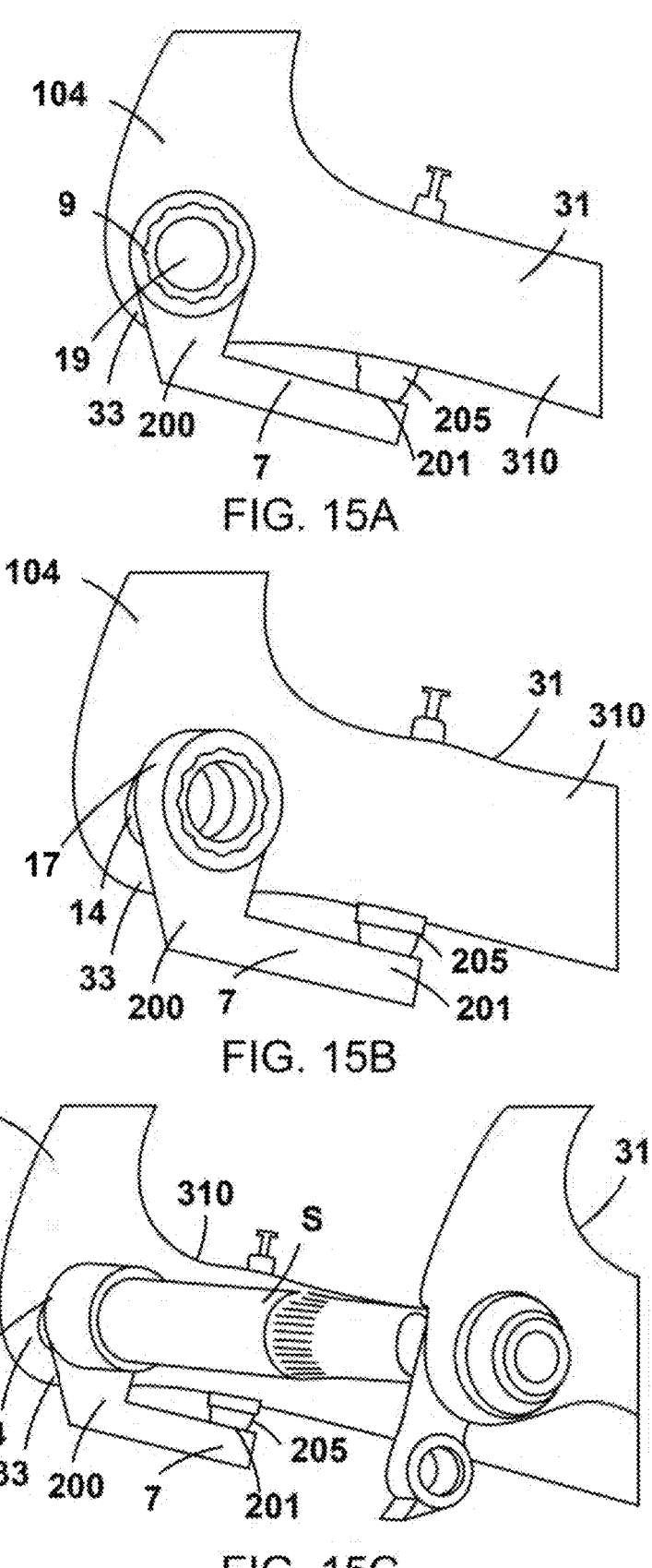
FIGS. 15A-15C show a torque support device.

In the example shown in FIG. 14, the torque support device 200 comprises a cavity 202 for accommodating electrical components, e.g. the first transmitter 120, the second receiver 124, the processor 116A, the battery 128 and/or an antenna e.g. for the second receiver 124. Similar as described in view of the examples shown in FIGS. 12 and 13, the first transmitter 120, the second receiver 124, the battery 128, and/or an antenna e.g. for the second receiver 124, can thus be arranged in the cavity 202 of the torque support device 200 or connected to the torque support device 200.

Figure 16A:
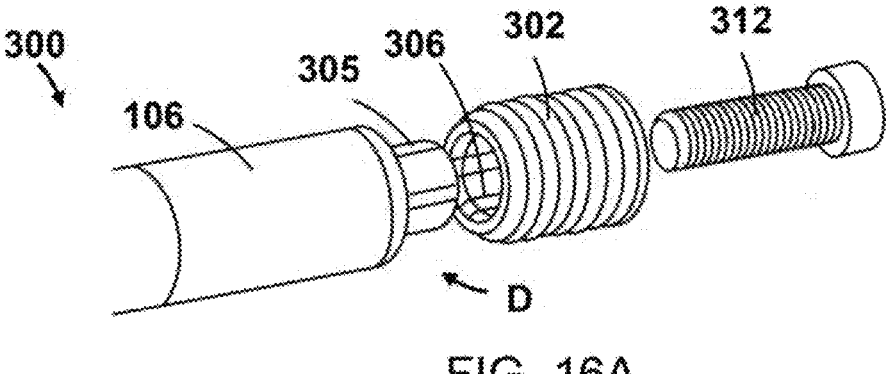
FIGS. 16A-16C show a securing device.
Figure 16B:
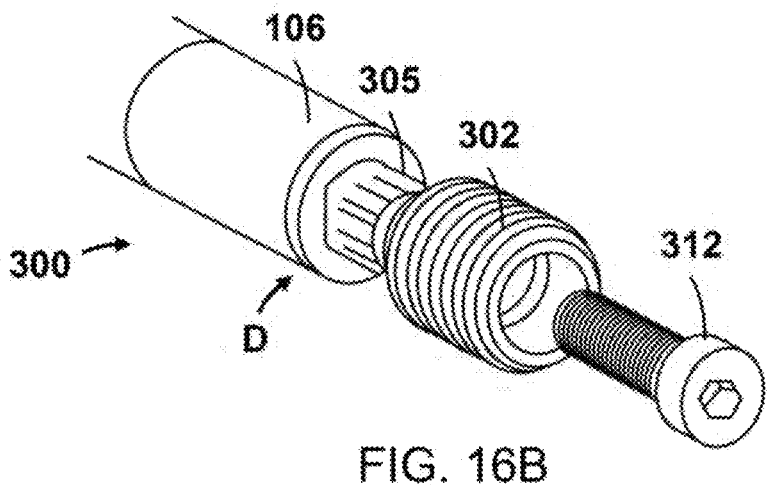
Figure 16C:
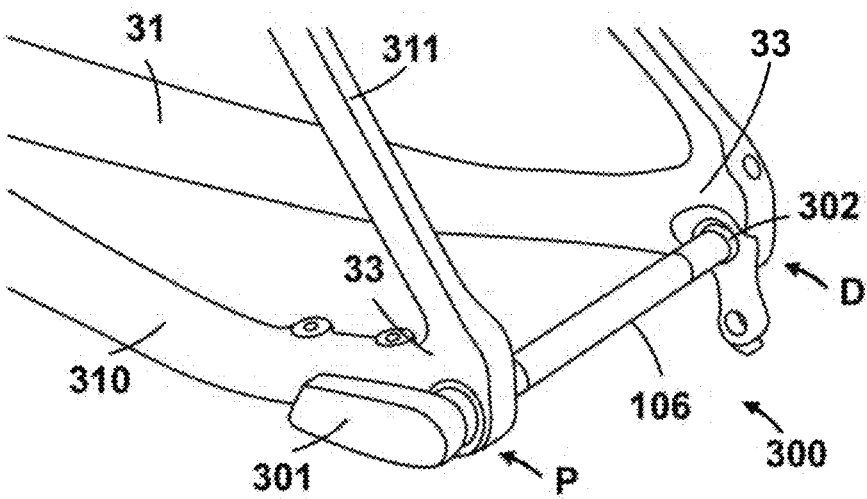

FIGS. 16A-16C show a wheel securing device 300 for securing a wheel to a bicycle frame 31. The securing device comprises a thru-axle 106 that is engageable with a dropout 104 of the bicycle frame 31. At a proximal end P of the thru-axle 106 a thru-axle handle 301 is provided. At a distal end D of the thru-axle a threaded tip 302 is provided, having an external thread 303 for engaging a complementary internal thread of the dropout 104. The threaded tip is detachably coupled to the distal end of the thru-axle 106. The handle 301 can be used to provide the thru-axle 106 through the holes in the front or rear dropouts of the bicycle frame 31 and through a corresponding front or rear wheel hub, so as to secure the wheel hub, and thus the wheel, to the frame 31. As best seen in FIG. 16C, the handle 301 extends substantially transverse to the axial direction of the thru-axle 106, to facilitate the screwing of the thru-axle 106 into the dropout.

The distal end D of the thru-axle 106 comprises an axial spline 305 arranged for cooperating with an axial spline 306 of the tip 302, to establish a rotationally rigid coupling between the thru-axle and the tip 302. The tip 302 is rigidly fixed to the thru-axle, here by means of a threaded connector 312 which extends through an axial through hole 308 of the tip 302 and into an axial bore 309 of the thru-axle 106.

To minimize aerodynamic drag, of handle 301 can be adjusted relative to the frame 31, in particular relative to the chain-stay 310 and seat-stay 311. Thread of the tip can be machined so as to have multiple engagement starting points, to facilitate the insertion of the insert 302 into the dropout through hole. The handle 301 can end up in various angular orientations with respect to the frame 31, after screwing the insert 302 in the dropout 33. Some of these orientations may be aerodynamically sub-optimal. The handle 301 orientation can be adjusted, after the tip has been inserted into the dropout 33, by detaching the thru-axle 106 from the tip 302. In this case, the thru-axle 106 can be detached from the tip 302 by unscrewing the connector 12, and axially retracting the thru-axle 106 to disengage the axial splines 305, 306. The thru-axle 106 can subsequently be rotated relative to the tip 302 to adjust the angular position of the handle 301, and be re-engaged with the tip 302. Here, the splines 305, 306 are configured to allow ten distinct adjustment positions of the thru-axle 106 relative to the insert 302, but it will be appreciated that smaller or larger adjustment-increments can obtained by altering the indexing of the splines 305, 306 accordingly.

Herein, the invention is described with reference to specific examples. It will, however, be evident that various modifications and changes may be made therein, without departing from the essence of the invention. For the purpose of clarity and a concise description features are described herein as part of the same or separate embodiments, however, embodiments having combinations of all or some of the features described in these separate examples are also envisaged.

In the examples of FIGS. 12 and 13 one torque support assembly is mounted on the end of the shaft opposite the sprockets. It will be clear that it is also possible to mount one torque support assembly on the side of the shaft adjacent the sprockets. This is indicated in ghost as 1'. It is also possible to mount a torque support assembly on each end of the shaft.

In a described example, the transmission includes a planetary gear with a sun wheel, planet carrier for planet gears and ring gear. It will be appreciated that it is also possible that the planetary gear includes two sun gears and two sets of planet gears.

However, other modifications, variations, and alternatives are also possible, such as the addition of an electric drive motor included in the axle assembly, the electric drive motor being connected to the shaft S. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A torque support assembly, for supporting a torque of a hollow shaft onto a frame of a bicycle, comprising:
   a cam comprising a cam hole for receiving therein a distal end of the shaft, wherein the cam hole and the shaft are interlockingly shaped for rotationally locking the cam and shaft with respect to each other;
   an adapter interface comprising
      a first face defining a seat for the cam, and
      an adapter interface through hole which extends from the seat on the first face and is coaxial with the cam hole for allowing a thru-axle to extend there through,
   wherein the adapter interface comprises an upstanding wall, extending outward from the first face, defining an inner support surface of the seat on which the cam is supported against rotation;
   wherein the adapter interface is placed on an adapter comprising a second face, opposite the first face, for being inserted therewith into a recess of a dropout of the frame and wherein the adapter is fixable to the frame.

2. The assembly according to claim 1, wherein the adapter is arranged for supporting at least some torque forces onto the frame via one or more of an edge of the recess of the dropout of the frame; a through hole of the recess of the dropout of the frame; a brake caliper connection of the frame; or the thru-axle.

3. The assembly according to claim 1, wherein the upstanding wall is formed as a complementary shape to an upper contour of the cam, such that the cam self-centers within the seat when, in use, an upward force is exerted on the cam by interaction of the upper contour of the cam and the upstanding wall.

4. The assembly according to claim 1, wherein the adapter comprises a base which, in use, extends into a length direction of the frame, wherein the base comprises at least one screw seat, for fastening the adapter there through onto a brake caliper connection of the frame, such that the adapter interface through hole is aligned with a through hole in the dropout of the frame.

5. The assembly according to claim 4, comprising a fixable angularly adjustable connection for adjusting an angle with which the adapter is fixed to the frame.

6. The assembly according to claim 1, wherein the upstanding wall partly extends around the adapter interface through hole such that opposing parts of a supporting surface around the adapter through hole diverge from each other in a downward direction.

7. The assembly according to claim 1, wherein the adapter comprises a boss extending from the second face arranged for resting in the recess of the dropout.

8. The assembly according to claim 1, wherein the cam or the adapter interface holds one or more of a wireless receiver for receiving a shift signal and an electrical power storage.

9. The assembly according to claim 1, wherein there is an electrical connection between the adapter interface, the cam, the thru-axle and/or a wheel axle of the bicycle.

10. The assembly according to claim 1, wherein the cam and the adapter interface are integrated to form a single torque support body.

11. A torque support device, for supporting a torque of a hollow shaft onto a frame of a bicycle, comprising:
   a cam hole for receiving therein a distal end of the shaft, wherein the cam hole and the shaft are interlockingly shaped for rotationally locking the torque support device and shaft with respect to each other;
   a through hole extending, coaxially with respect to the cam hole, through the torque support device;
   a base extending from a remainder of the torque support device in a direction transverse to a direction in which the through hole extends, the base being arranged for engaging the frame of the bicycle so as to support torque thereon;
   a first face for facing the hollow shaft, and a second face for facing a dropout recess;
      wherein the torque support device includes a wired or wireless receiver at least partially located at a plane between the first and second faces for receiving a shift signal.

12. The torque support device according to claim 11, wherein the torque support device is configured to be nested in a dropout recess of the frame of the bicycle.

13. The torque support device according to claim 12, comprising a first face for facing the hollow shaft, and a second face for facing the dropout recess, wherein a boss, extending from the second face, is configured for resting in the dropout recess.

14. The torque support device according to claim 11, wherein the base comprises an abutment surface arranged for abutting the frame.

15. The torque support device according to claim 14, wherein the abutment surface is configured for abutting a disc-brake mount connector.

16. A rear axle assembly, comprising:
   a rear axle assembly, comprising:
   a hollow shaft a wheel hub, a sprocket or a plurality of sprockets rotatably mounted to the hollow shaft, a transmission between the sprocket or plurality or sprockets and the wheel hub, wherein the transmission includes an electrically actuatable actuator for selecting one of at least two selectable drives; and
   a torque support device, for supporting a torque of the hollow shaft onto a frame of a bicycle, the torque support device comprising:
      a cam hole for receiving therein a distal end of the shaft, wherein the cam hole and the shaft are interlockingly shaped for rotationally locking the torque support device and shaft with respect to each other;
      a through hole extending, coaxially with respect to the cam hole, through the torque support device;
      a base extending from a remainder of the torque support device in a direction transverse to a direction in which the through hole extends, the base being arranged for engaging the frame of the bicycle so as to support torque thereon,
   wherein the torque support device includes a wired or wireless receiver for receiving a shift signal.

17. The rear axle assembly according to claim 16, wherein a detachable electric connection is provided between the torque support device and the actuator.

18. The rear axle assembly according to claim 16, wherein the torque support device includes an actuator controller arranged for controlling the actuator.

19. A bicycle comprising the rear axle assembly according to claim 16.

* * * * *